United States Patent
Fu et al.

(10) Patent No.: US 11,445,495 B2
(45) Date of Patent: *Sep. 13, 2022

(54) METHOD AND APPARATUS FOR RECEIVING DOWNLINK CONTROL CHANNEL IN WIRELESS COMMUNICATION SYSTEM

(71) Applicant: Samsung Electronics Co., Ltd., Suwon-si (KR)

(72) Inventors: Jingxing Fu, Beijing (CN); Bin Yu, Beijing (CN); Chen Qian, Beijing (CN); Qi Xiong, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/231,506

(22) Filed: Apr. 15, 2021

(65) Prior Publication Data

US 2021/0235427 A1    Jul. 29, 2021

Related U.S. Application Data

(63) Continuation of application No. 15/972,667, filed on May 7, 2018, now Pat. No. 10,986,620.

(30) Foreign Application Priority Data

May 5, 2017   (CN) .......................... 201710312942.7
Jan. 11, 2018  (CN) .......................... 201810028300.9

(51) Int. Cl.
*H04W 72/04*   (2009.01)

(52) U.S. Cl.
CPC ........ *H04W 72/042* (2013.01); *H04W 72/044* (2013.01)

(58) Field of Classification Search
None
See application file for complete search history.

(56) References Cited

U.S. PATENT DOCUMENTS

| | | |
|---|---|---|
| 2014/0204812 A1 | 7/2014 | Li et al. |
| 2017/0041829 A1 | 2/2017 | Dai et al. |

(Continued)

FOREIGN PATENT DOCUMENTS

| | | |
|---|---|---|
| EP | 3 596 984 A1 | 1/2020 |
| WO | 2015/200804 A1 | 12/2015 |

(Continued)

OTHER PUBLICATIONS

Huawei et al: "Resource allocation and indication for data channel", 3GPP Draft; R1-1705069, April (Year: 2017).*

(Continued)

*Primary Examiner* — Kouroush Mohebbi
(74) *Attorney, Agent, or Firm* — Jefferson IP Law, LLP

(57) ABSTRACT

The present disclosure relates to a pre-5th-Generation (5G) or 5G communication system to be provided for supporting higher data rates Beyond 4th-Generation (4G) communication system such as Long Term Evolution (LTE). A technique for receiving a downlink control channel is provided that includes operations of determining whether a physical downlink shared channel (PDSCH) is received at a time-domain position n; determining, according to a result of the determining, a frequency-domain position of a bandwidth part (BWP) for receiving a physical downlink control channel (PDCCH) at a time-domain position n+1, and receiving the PDCCH at the BWP of the frequency-domain position. The technique determines the frequency-domain position of the BWP for receiving the PDCCH by determining whether it is necessary to receive the PDSCH at the time-domain position preceding the current time-domain position for receiving the PDCCH, greatly reducing or even eliminating (Continued)

the influence of the adjustment time interval for the user equipment (UE) to convert the BWP on the normal data reception of the UE, which ensures the receiving performance and the throughput level of the received data of the UE.

8 Claims, 21 Drawing Sheets

(56) References Cited

U.S. PATENT DOCUMENTS

| | | |
|---|---|---|
| 2018/0375636 A1 | 12/2018 | You et al. |
| 2019/0223176 A1* | 7/2019 | Liu .................. H04W 48/12 |

FOREIGN PATENT DOCUMENTS

| | | | |
|---|---|---|---|
| WO | 2016/164739 A1 | 10/2016 | |
| WO | WO-2016164739 A1 * | 10/2016 | ........... H04L 1/0026 |
| WO | 2018/194352 A1 | 10/2018 | |

OTHER PUBLICATIONS

Huawei et al., Discussion on sPDCCH design, 3GPP TSG RAN WG1 Meeting #88, R1-1701731, Feb. 13-17, 2017, Athens, Greece.
Ericsson, Introduction of Further Enhanced MTC for LTE, 3GPP TSG-RAN WG1 Meeting #88, R1-1704159, Feb. 13-17, 2017, Athens, Greece.
Samsung, "Flexible BW supports in NR", 3GPP Draft, R2-1704501, 3GPP TSG-RAN WG2 NR #98 Meeting, Hangzhou, China, May 15, 2017-May 19, 2017, May 4, 2017, XP051263604.
Samsung, "RAN2 impacts from bandwidth part in NR", 3GPP Draft, R2-1704503, 3GPP TSG-RAN WG2 NR #98 Meeting, Hangzhou, China, May 15, 2017-May 19, 2017, May 4, 2017, XP051263606.
Extended European Search Report dated Mar. 30, 2020, issued in European Patent Application No. 18794995.3.
European Office Action dated Aug. 14, 2020, issued in European Patent Application No. 18794995.3.
Huawei et al., "Resource allocation and indication for data channel," 3GPP TSG RAN WG1 Meeting #88bis, R1-1705069, Spokane, USA Apr. 3-7, 2017.
Extended European Search Report dated Nov. 25, 2021, issued in European Patent Application No. 21191735.6.
Korean office Action dated Jun. 7, 2022, issued in Korean Application No. 10-2019-7035291.

* cited by examiner

METHOD AND APPARATUS FOR RECEIVING DOWNLINK CONTROL CHANNEL IN WIRELESS COMMUNICATION SYSTEM

CROSS-REFERENCE TO RELATED APPLICATION(S)

This application is a continuation application of prior application Ser. No. 15/972,667, filed on May 7, 2018, which was based on and claimed priority under 35 U.S.C. § 119(a) of a Chinese patent application number 201710312942.7, filed on May 5, 2017, in the Chinese Intellectual Property Office, and of a Chinese patent application number 201810028300.9, filed on Jan. 11, 2018, in the Chinese Intellectual Property Office, the disclosure of each of which is incorporated by reference herein in its entirety.

BACKGROUND

1. Field

The disclosure relates to the field of wireless communication technology. More particularly, the disclosure relates to a method and an apparatus for receiving a downlink control channel in a wireless communication system.

DESCRIPTION OF RELATED ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post long term evolution (LTE) System'.

The 5G communication system is considered to be implemented in higher frequency millimeter wave (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The 5G system may provide services by using very wide bandwidth. However, depending on capability of a user equipment (UE), the UE may perform communications using a bandwidth that is narrower than a total system bandwidth. Hence, it is needed to effectively operate a base station and the UE with consideration for the system bandwidth and an operation bandwidth of the UE.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus method and user equipment for receiving downlink control channel with a better throughput performance of data reception.

Another aspect of the disclosure is to provide a method and equipment for Hybrid Automatic Repeat Request-Acknowledgement (HARQ-ACK) information feedback, which may effectively perform transmission of HARQ-ACK feedback information.

Additional aspects will be set forth in part in the description which follows and, in part, will be apparent from the description, or may be learned by practice of the presented embodiments.

In accordance with an aspect of the disclosure, a method for receiving downlink control channel, which comprises the following steps:

In accordance with an aspect of the disclosure, deciding whether a physical downlink shared channel (PDSCH) is received at a time-domain position n.

In accordance with an aspect of the disclosure, determining a frequency-domain position of a bandwidth part (BWP) for receiving a physical downlink control channel (PDCCH) at a time-domain position n+1, according to a result of the step of deciding, and receiving the PDCCH at the BP of the frequency-domain position.

Preferably, the step of determining the frequency-domain position of the BP for receiving the PDCCH at the time-domain position n+1 according to the result of the step of deciding, comprises if the result of the step of deciding is positive, determining the frequency-domain position of the BP for receiving the PDCCH at the time-domain position n+1 to be the same as a frequency-domain position of the BP where the PDSCH is received at the time-domain position n.

Preferably, the step of determining the frequency-domain position of the BP for receiving the PDCCH at the time-domain position n+1 according to the result of the step of deciding, comprises a step of if the result of the step of deciding is negative, determining the frequency-domain position of the BP for receiving the PDCCH at the time-domain position n+1 according to whether a PDSCH has been received at a time-domain position n−k preceding the time-domain position n.

Preferably, the step of determining the frequency-domain position of the BP for receiving the PDCCH at the time-domain position n+1 according to whether the PDSCH has been received at the time-domain position n−k preceding the time-domain position n, comprises if the PDSCH has been received at the time-domain position n−k, determining the frequency-domain position of the BP for receiving the PDCCH at the time-domain position n+1 to be the same as a frequency-domain position of a BP where the PDSCH has been received at the time-domain position n−k, and, wherein the time-domain position n−k is a time-domain position that is closest to the time-domain position n among time-domain positions at which a PDSCH has been received.

Preferably, the step of determining the frequency-domain position of the BP for receiving the PDCCH at the time-domain position n+1 according to whether the PDSCH has been received at the time-domain position n−k preceding the time-domain position n, comprises if no PDSCH has been received at the time-domain position n−k, the frequency-domain position of the BP for receiving the PDCCH at the time-domain position n+1 is determined by a signaling received from a base station.

Preferably, receiving a PDCCH at time-frequency positions configured by a higher-layer signaling, wherein, the time-frequency positions configured by the higher-layer signaling have a same frequency-domain value, and performing deciding whether the PDSCH is received at the time-domain position n, wherein, if a time-domain index of the time-frequency positions configured by the higher-layer signaling is denoted as t, then t≠n+1.

Preferably, the step of determining the frequency-domain position of the BP for receiving the PDCCH at the time-domain position n+1 according to the result of the step of deciding, comprises if the result of the step of deciding is positive, determining the frequency-domain position of the BP for receiving the PDCCH at the time-domain position n+1 by a signaling received from a base station.

Preferably, after the step of determining whether the PDSCH is received at the time-domain position n, the method further comprises a step of if it is necessary to receive the PDSCH at the time-domain position n, receiving the PDSCH at the front part of the time-domain position n.

Preferably, the step of receiving the PDSCH at the front part of the time-domain position n, comprises receiving the PDSCH within a first a (a is a positive integer) orthogonal frequency division multiplexing (OFDM) symbols at the time-domain position n, and wherein, the a OFDM symbols are predetermined by an agreed rule or indicated by a higher-layer signaling.

Preferably, the steps of determining the frequency-domain position of the BP for receiving the PDCCH at the time-domain position n+1 according to the result of the step of deciding, and receiving the PDCCH at the BP of the frequency-domain position, comprises the step of determining, according to the result of step of deciding, the frequency-domain position of the BP for receiving the PDCCH at the time-domain position n+1; and receiving the PDCCH at a time-frequency resource determined by the frequency-domain position and the posterior part of the time-domain position n+1.

Preferably, the steps of determining, according to the result of the step of deciding, the frequency-domain position of the BWP for receiving the PDCCH at the time-domain position n+1, and receiving the PDCCH at the time-frequency resource determined by the frequency-domain position and the posterior part of the time-domain position n+1, comprise determining the frequency-domain position of the BWP for receiving the PDCCH at the time-domain position n+1 according to the result of the step of deciding; and receiving the PDCCH at the time-frequency resource determined by the frequency-domain position and the last b (b is a positive integer) OFDM symbols of the time-domain position n+1, wherein, the b OFDM symbols are predetermined by an agreed rule or indicated by the higher-layer signaling.

In order to achieve the above purpose, the disclosure further provides a UE for receiving a downlink control channel, which comprising: a deciding module, configured to decide whether it is necessary to receive a physical downlink shared channel (PDSCH) at a time-domain position n; a receiving module, configured to determine, according to a decision of the deciding module, a frequency-domain position of a bandwidth part (BWP) for receiving a physical downlink control channel (PDCCH) at a time-domain position n+1, and to receive the PDCCH at the BWP of the frequency-domain position.

Compared with the prior art, the technical effects of the disclosure include by determining whether it is necessary to receive the PDSCH at the time-domain position preceding the current time-domain position where the PDCCH is received to determine the frequency-domain position of the BWP where the PDCCH is received, the disclosure greatly reduces or even eliminates the influence of the interval of the adjustment time for the UE converting BWP on the normal data reception of the UE, and ensures the receiving performance of the UE and the throughput level of the received data of the UE.

The present disclosure also provides a method for HARQ-ACK information feedback, comprising: determining, by a UE, PUCCH resources for transmitting HARQ-ACK feedback information according to received broadcast information and physical layer information; transmitting, by the UE, HARQ-ACK on the determined PUCCH resources.

Preferably, the step of determining, by the UE, the PUCCH resources for transmitting the HARQ-ACK feedback information according to the received broadcast information and physical layer information when the physical layer information includes PUCCH resource indication information, comprises: determining, by the UE, a PUCCH resource set for transmitting HARQ-ACK feedback information according to the broadcast information by receiving the broadcast information; selecting, by the UE, one PUCCH resource from the PUCCH resource set to transmit the HARQ-ACK feedback information by receiving the PUCCH resource indication information in a PDCCH scheduling a PDSCH.

Preferably, an indication mode for the PUCCH resources comprises: indicating the PUCCH resources for transmitting the HARQ-ACK feedback information by the broadcast information and the physical layer information, or indicating the PUCCH resources for transmitting the HARQ-ACK feedback information by a UE-specific high-layer signaling and the physical layer information; before the step of determining, by the UE, the PUCCH resources for transmitting the HARQ-ACK feedback information according to the received broadcast information and physical layer information, the method further comprises: the UE determines the indication mode of the PUCCH resources as follows: indicating the PUCCH resources for transmitting the HARQ-ACK feedback information by the broadcast information and the physical layer information.

Preferably, in the PUCCH resource set for transmitting the HARQ-ACK feedback information determined according to the broadcast information, the numbers of PUCCH resources are the same or different.

Preferably, the PUCCH resource indication information includes only ARI; and/or the PUCCH resource indication information comprises the ARI and information of other fields.

Preferably, the other fields include at least one of DAI, HARQ timing relationship indication information, and indication information of the number of HARQ processes.

Preferably, the determining the PUCCH resource indication mode comprises at least one of the following: determining the PUCCH resource indication mode according to a type of a search space of DCI; determining the PUCCH resource indication mode according to a type of a radio network temporary identifier of the DCI; determining the PUCCH resource indication mode jointly according to the type of the search space of the DCI and the type of the RNTI of the DCI; determining the PUCCH resource indication mode according to a format type of the DCI.

Preferably, the determining the PUCCH resource indication mode according to the format type of the DCI comprises: determining the PUCCH resource indication mode according to the number of bits of the PUCCH resource indication information in the format type of the DCI.

Preferably, wherein a manner to determine the number of bits of the PUCCH resource indication information comprises: obtaining the number of bits of the PUCCH resource indication information preset; or determining the number of bits of the PUCCH resource indication information according to the number of PUCCH resources in the PUCCH resource set indicated by the broadcast information.

A user equipment is provided, comprising: a PUCCH resource indication mode determining unit, a resource set determining unit, a resource determining unit, and a transmitting unit; wherein, the PUCCH resource indication mode determining unit is configured to determine a PUCCH resource indication mode for transmitting HARQ-ACK; the resource set determining unit is configured to determine a PUCCH resource set for transmitting the HARQ-ACK; the resource determining unit is configured to determine PUCCH resources for transmitting a HARQ-ACK feedback information; and the transmitting unit is configured to transmit the HARQ-ACK according to the determined PUCCH resources.

A user equipment is provided, including: a processor; and a memory configured to store machine-readable instructions that, when executed by the processor, cause the processor to perform the above described method for HARQ-ACK information feedback.

As may be seen from the above technical solution, the method for HARQ-ACK information feedback provided by the present disclosure may reasonably determine the number of resources in a set of PUCCH resources for transmitting the HARQ-ACK feedback information indicated by a Remaining Minimum System Information (RMSI), so that the users in the serving cells are ensured to access the system in time, and the number of bits of ARI in the PDCCH used to dynamically indicate the PUCCH is not wasted.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, in various embodiments of the disclosure, hardware approaches will be described as an example. However, various embodiments of the disclosure include a technology that uses both hardware and software and thus, the various embodiments of the disclosure may not exclude the perspective of software.

Hereinafter, the disclosure describes technology for receiving a downlink control information in a wireless communication system.

The terms referring to a signal, the terms referring to a channel, the terms referring to control information, the terms referring to a network entity, and the terms referring to elements of a device used in the following description are used only for convenience of the description. Accordingly, the disclosure is not limited to the following terms, and other terms having the same technical meaning may be used.

Further, although the disclosure describes various embodiments based on the terms used in some communication standards (for example, 3rd generation partnership project (3GPP)), they are only examples for the description. Various embodiments of the disclosure may be easily modified and applied to other communication systems.

Figure 1:
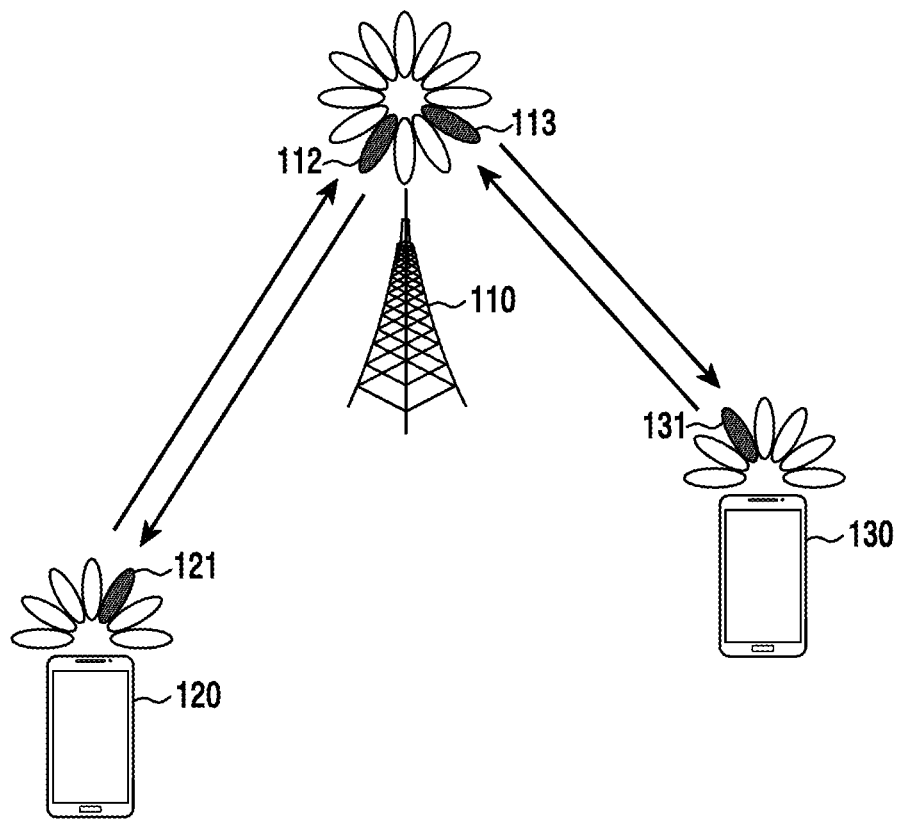
FIG. 1 illustrates a wireless communication system according to various embodiments of the disclosure.

FIG. 1 illustrates a wireless communication system according to various embodiments of the disclosure.

Referring to FIG. 1, a base station (BS) 110, a terminal 120, and a terminal 130 are illustrated as the part of nodes using a wireless channel in a wireless communication system. FIG. 1 illustrates only one BS, but another BS, which is the same as or similar to the BS 110, may be further included.

The BS 110 is network infrastructure that provides wireless access to the terminals 120 and 130. The BS 110 has coverage defined as a predetermined geographical region based on the distance at which a signal can be transmitted. The BS 110 may be referred to as "access point (AP)," "evolved NodeB (eNB)," "5th generation (5G) node," "wireless point," "transmission/reception point (TRP)" as well as "base station."

Each of the terminals 120 and 130 is a device used by a user, and performs communication with the BS 110 through a wireless channel Depending on the case, at least one of the terminals 120 and 130 may operate without user involvement. That is, at least one of the terminals 120 and 130 is a device that performs machine-type communication (MTC) and may not be carried by the user. Each of the terminals 120 and 130 may be referred to as "UE," "mobile station," "subscriber station," "remote terminal," "wireless terminal," or "user device" as well as "terminal."

The BS 110, the terminal 120, and the terminal 130 may transmit and receive wireless signals in millimeter wave (mmWave) bands (for example, 28 GHz, 30 GHz, 38 GHz, and 60 GHz). At this time, in order to improve a channel gain, the BS 110, the terminal 120, and the terminal 130 may perform beamforming. The beamforming may include transmission beamforming and reception beamforming That is, the BS 110, the terminal 120, and the terminal 130 may assign directivity to a transmission signal and a reception signal. To this end, the BS 110 and the terminals 120 and 130 may select serving beams 112, 113, 121, and 131 through a beam search procedure or a beam management procedure. After that, communications may be performed using resources having a quasi co-located relationship with resources carrying the serving beams 112, 113, 121, and 131.

A first antenna port and a second antenna ports are considered to be quasi co-located if the large-scale properties of the channel over which a symbol on the first antenna port is conveyed can be inferred from the channel over which a symbol on the second antenna port is conveyed. The large-scale properties may include one or more of delay spread, doppler spread, doppler shift, average gain, average delay, and spatial Rx parameters.

In a new radio (NR) air interface system, a UE is possible to receive downlink control signaling and data within a part of a bandwidth in a large frequency-domain bandwidth due to the limited capability of the frequency domain processing and the relatively large system bandwidth. In order to improve frequency diversity performance of the user, the user can work within different limited frequency bands at different times.

Figure 2A:
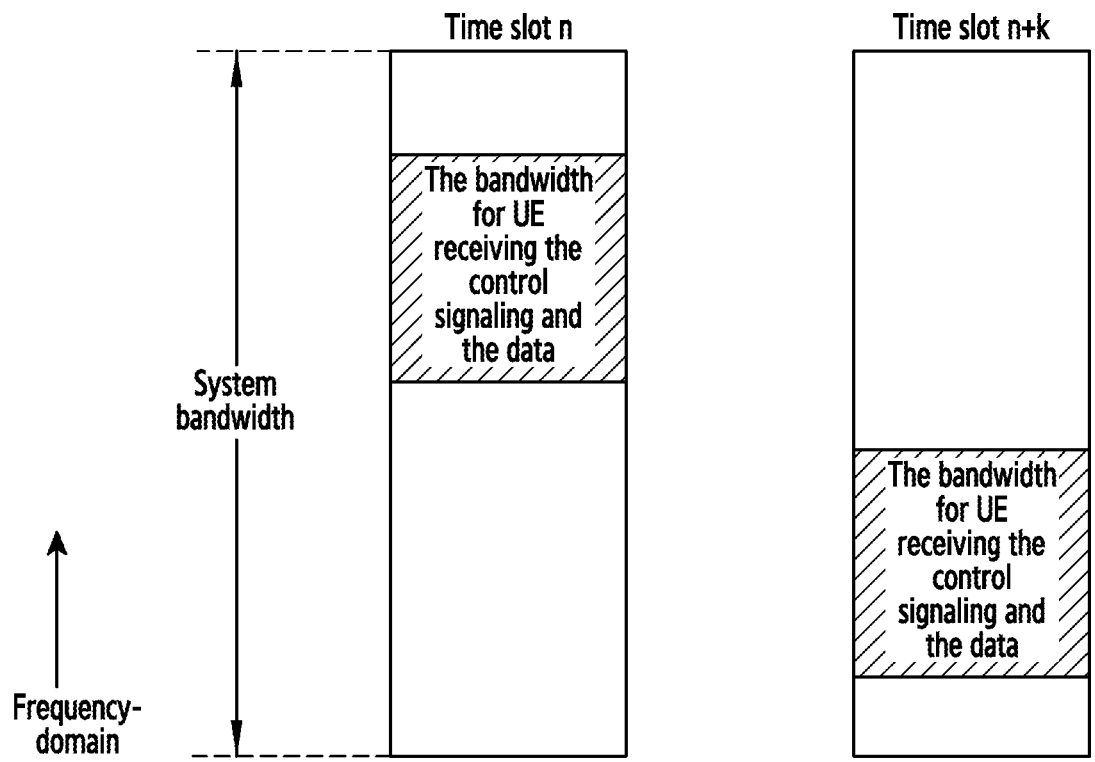
FIG. 2A is a schematic diagram of a limited frequency band in which a user equipment (UE) operates in the background art embodiments of the disclosure.

FIG. 2A is a schematic diagram of a limited frequency band in which a user equipment (UE) operates in the background art embodiments of the disclosure.

Referring to FIG. 2A, a limited frequency band can be called as a band part (BWP) or a bandwidth part (BWP).

Figure 2B:
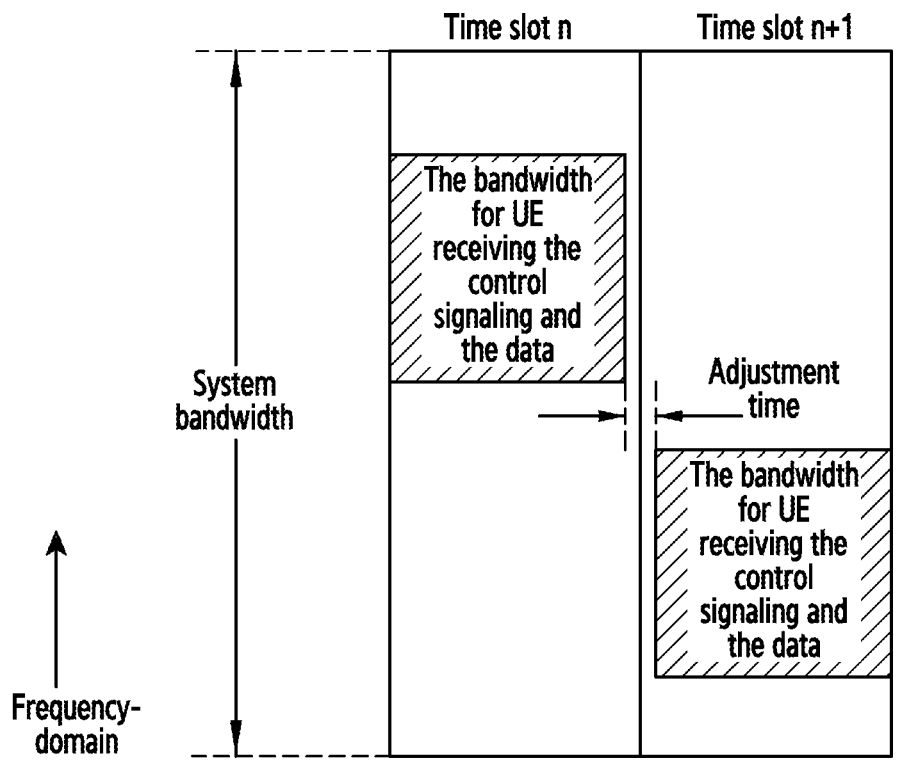
FIG. 2B is a schematic diagram of an adjustment time for the UE converting bandwidth part (BWP) in the background art embodiments of the disclosure.

FIG. 2B is a schematic diagram of an adjustment time for the UE converting bandwidth part (BWP) in the background art embodiments of the disclosure.

When the UE moves from one BWP at the time-domain position n to another BWP at the time-domain position n+1, an adjustment time is required, during which the UE cannot normally receive data, as shown in FIG. 2B.

When the UE can be configured to receive a physical downlink control channel (PDCCH) and a physical downlink shared channel (PDSCH) in a multiple of BWPs, and only receive the PDCCH and PDSCH within one BWP at a same time, if the position of the BWP where the UE receives the PDCCH at each moment and the way that the UE receives the PDCCH at the BWP cannot be configured properly, the throughput performance of system data reception will be affected. Regarding this, it is necessary to provide a method and a UE for receiving a downlink control channel which can solve the above technical problem.

Figure 3:
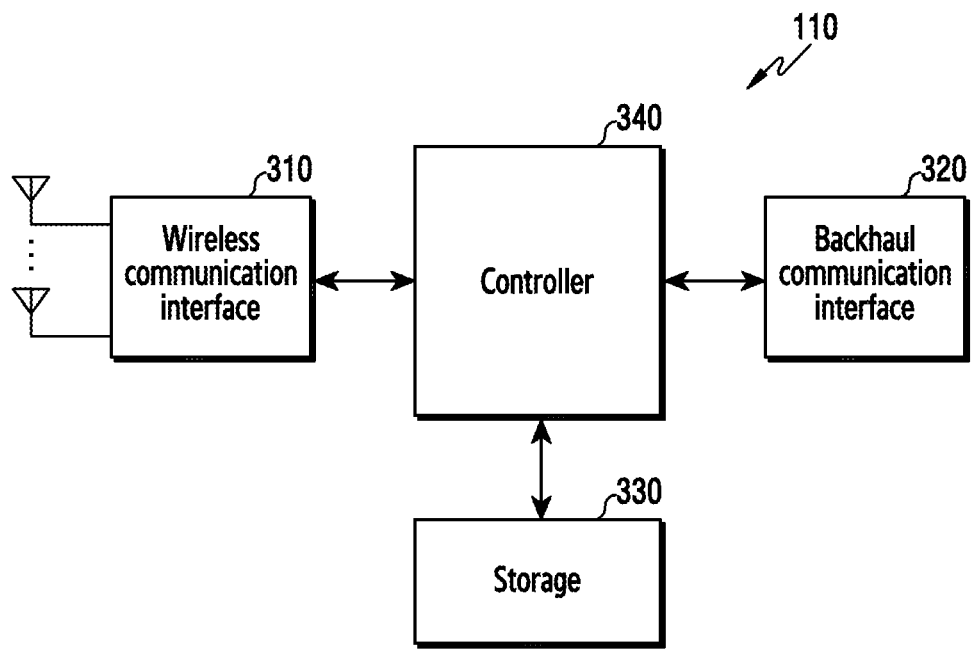
FIG. 3 illustrates the base station (BS) in the wireless communication system according to various embodiments of the disclosure.

FIG. 3 illustrates the BS in the wireless communication system according to various embodiments of the disclosure. A structure exemplified at FIG. 3 may be understood as a structure of the BS 110. The term "-module", "-unit" or "-er" used hereinafter may refer to the unit for processing at least one function or operation and may be implemented in hardware, software, or a combination of hardware and software.

Referring to FIG. 3, the BS may include a wireless communication interface 310, a backhaul communication interface 320, a storage unit 330, and a controller 340.

The wireless communication interface 310 performs functions for transmitting and receiving signals through a wireless channel. For example, the wireless communication interface 310 may perform a function of conversion between a baseband signal and bitstreams according to a physical layer standard of the system. For example, in data transmission, the wireless communication interface 310 generates complex symbols by encoding and modulating transmission bitstreams. Further, in data reception, the wireless communication interface 310 reconstructs reception bitstreams by demodulating and decoding the baseband signal.

In addition, the wireless communication interface 310 up-converts the baseband signal into an radio frequency (RF) band signal, transmits the converted signal through an antenna, and then down-converts the RF band signal received through the antenna into the baseband signal. To this end, the wireless communication interface 310 may include a transmission filter, a reception filter, an amplifier, a mixer, an oscillator, a digital-to-analog convertor (DAC), an analog-to-digital convertor (ADC), and the like. Further, the wireless communication interface 310 may include a plurality of transmission/reception paths. In addition, the wireless communication interface 310 may include at least one antenna array consisting of a plurality of antenna elements.

On the hardware side, the wireless communication interface 310 may include a digital unit and an analog unit, and the analog unit may include a plurality of sub-units according to operation power, operation frequency, and the like. The digital unit may be implemented as at least one processor (e.g., a digital signal processor (DSP)).

The wireless communication interface 310 transmits and receives the signal as described above. Accordingly, the wireless communication interface 310 may be referred to as a "transmitter" a "receiver," or a "transceiver." Further, in the following description, transmission and reception performed through the wireless channel may be used to have a meaning including the processing performed by the wireless communication interface 310 as described above.

The backhaul communication interface 320 provides an interface for performing communication with other nodes within the network. That is, the backhaul communication interface 320 converts bitstreams transmitted to another node, for example, another access node, another BS, a higher node, or a core network, from the BS into a physical signal and converts the physical signal received from the other node into the bitstreams.

The storage unit 330 stores a basic program, an application, and data such as setting information for the operation of the BS 110. The storage unit 330 may include a volatile memory, a non-volatile memory, or a combination of volatile memory and non-volatile memory. Further, the storage unit 330 provides stored data in response to a request from the controller 340.

The controller 340 controls the general operation of the BS. For example, the controller 340 transmits and receives a signal through the wireless communication interface 310 or the backhaul communication interface 320. Further, the controller 340 records data in the storage unit 330 and reads the recorded data. The controller 340 may performs functions of a protocol stack that is required from a communication standard. According to another implementation, the protocol stack may be included in the wireless communication interface 310. To this end, the controller 340 may include at least one processor. According to exemplary embodiments of the disclosure, the controller 340 may control the base station to perform operations according to the exemplary embodiments of the disclosure.

Figure 4:
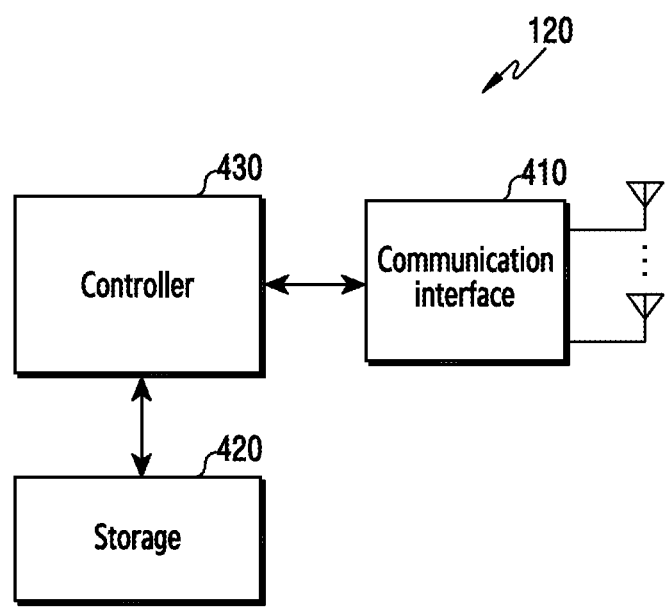
FIG. 4 illustrates the terminal in the wireless communication system according to various embodiments of the disclosure.

FIG. 4 illustrates the terminal in the wireless communication system according to various embodiments of the disclosure. A structure exemplified at FIG. 4 may be understood as a structure of the terminal 120 or the terminal 130. The term "-module", "-unit" or "-er" used hereinafter may refer to the unit for processing at least one function or operation, and may be implemented in hardware, software, or a combination of hardware and software.

Referring to FIG. 4, the terminal 120 includes a communication interface 410, a storage unit 420, and a controller 430.

The communication interface 410 performs functions for transmitting/receiving a signal through a wireless channel. For example, the communication interface 410 performs a function of conversion between a baseband signal and bitstreams according to the physical layer standard of the system. For example, in data transmission, the communication interface 410 generates complex symbols by encoding and modulating transmission bitstreams. Also, in data reception, the communication interface 410 reconstructs reception bitstreams by demodulating and decoding the baseband signal. In addition, the communication interface 410 up-converts the baseband signal into an RF band signal, transmits the converted signal through an antenna, and then down-converts the RF band signal received through the antenna into the baseband signal. For example, the communication interface 410 may include a transmission filter, a reception filter, an amplifier, a mixer, an oscillator, a DAC, and an ADC.

Further, the communication interface 410 may include a plurality of transmission/reception paths. In addition, the communication interface 410 may include at least one antenna array consisting of a plurality of antenna elements. In the hardware side, the wireless communication interface 310 may include a digital circuit and an analog circuit (for example, a radio frequency integrated circuit (RFIC)). The digital circuit and the analog circuit may be implemented as one package. The digital circuit may be implemented as at least one processor (e.g., a DSP). The communication interface 410 may include a plurality of RF chains. The communication interface 410 may perform beamforming.

The communication interface 410 transmits and receives the signal as described above. Accordingly, the communication interface 410 may be referred to as a "transmitter," a "receiver," or a "transceiver." Further, in the following description, transmission and reception performed through the wireless channel is used to have a meaning including the processing performed by the communication interface 410 as described above.

The storage unit 420 stores a basic program, an application, and data such as setting information for the operation of the terminal 120. The storage unit 420 may include a volatile memory, a non-volatile memory, or a combination of volatile memory and non-volatile memory. Further, the storage unit 420 provides stored data in response to a request from the controller 430.

The controller 430 controls the general operation of the terminal 120. For example, the controller 430 transmits and receives a signal through the communication interface 410. Further, the controller 430 records data in the storage unit 420 and reads the recorded data. The controller 430 may performs functions of a protocol stack that is required from a communication standard. According to another implementation, the protocol stack may be included in the communication interface 410. To this end, the controller 430 may include at least one processor or microprocessor, or may play the part of the processor. Further, the part of the communication interface 410 or the controller 430 may be referred to as a communication processor (CP). According to exemplary embodiments of the disclosure, the controller 430 may control the terminal to perform operations according to the exemplary embodiments of the disclosure.

Figure 5:
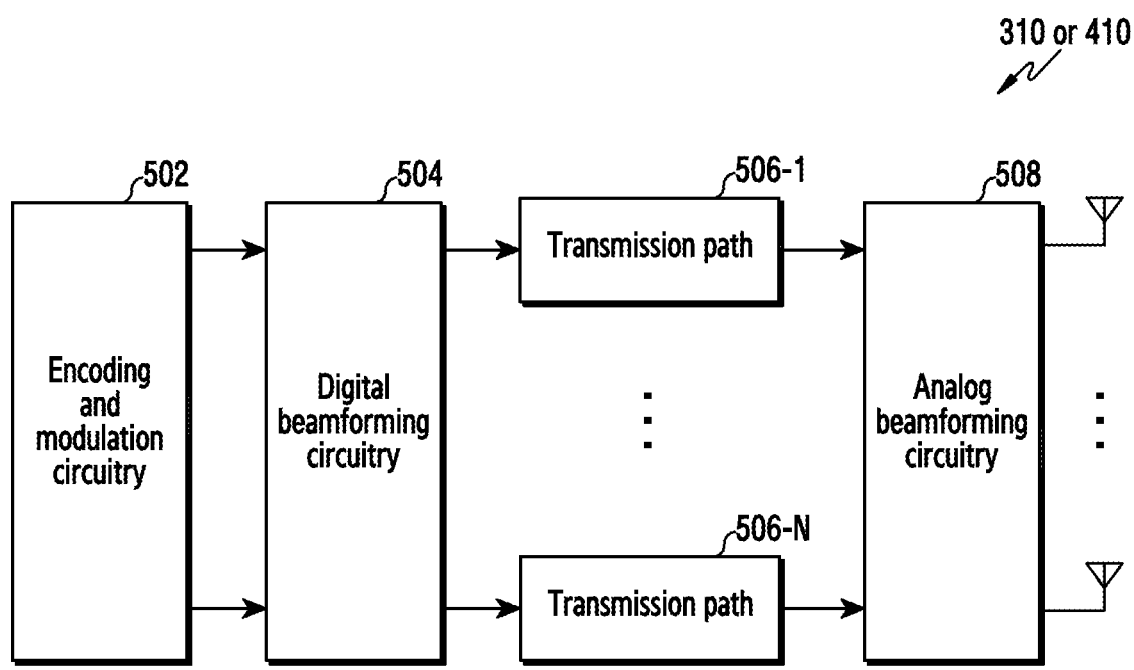
FIG. 5 illustrates the communication interface in the wireless communication system according to various embodiments of the disclosure.

FIG. 5 illustrates the communication interface in the wireless communication system according to various embodiments of the disclosure. FIG. 5 shows an example for the detailed configuration of the communication interface 310 of FIG. 3 or the communication interface 410 of FIG. 4. More specifically, FIG. 5 shows elements for performing beamforming as part of the communication interface 310 of FIG. 3 or the communication interface 410 of FIG. 4.

Referring to FIG. 5, the communication interface 310 or 410 includes an encoding and circuitry 502, a digital circuitry 504, a plurality of transmission paths 506-1 to 506-N, and an analog circuitry 508.

The encoding and circuitry 502 performs channel encoding. For the channel encoding, at least one of a low-density parity check (LDPC) code, a convolution code, and a polar code may be used. The encoding and circuitry 502 generates modulation symbols by performing constellation mapping.

The digital circuitry 504 performs beamforming for a digital signal (for example, modulation symbols). To this end, the digital circuitry 504 multiples the modulation symbols by beamforming weighted values. The beamforming weighted values may be used for changing the size and phrase of the signal, and may be referred to as a "precoding matrix" or a "precoder." The digital circuitry 504 outputs the digitally beamformed modulation symbols to the plurality of transmission paths 506-1 to 506-N. At this time, according to a multiple input multiple output (MIMO) transmission scheme, the modulation symbols may be multiplexed, or the same modulation symbols may be provided to the plurality of transmission paths 506-1 to 506-N.

The plurality of transmission paths 506-1 to 506-N convert the digitally beamformed digital signals into analog signals. To this end, each of the plurality of transmission paths 506-1 to 506-N may include an inverse fast Fourier transform (IFFT) calculation unit, a cyclic prefix (CP) insertion unit, a DAC, and an up-conversion unit. The CP insertion unit is for an orthogonal frequency division multiplexing (OFDM) scheme, and may be omitted when another physical layer scheme (for example, a filter bank multi-carrier: FBMC) is applied. That is, the plurality of transmission paths 506-1 to 506-N provide independent signal processing processes for a plurality of streams generated through the digital beamforming. However, depending on the implementation, some of the elements of the plurality of transmission paths 506-1 to 506-N may be used in common.

The analog circuitry 508 performs beamforming for analog signals. To this end, the digital circuitry 504 multiples the analog signals by beamforming weighted values. The beamformed weighted values are used for changing the size and phrase of the signal. More specifically, according to a connection structure between the plurality of transmission paths 506-1 to 506-N and antennas, the analog circuitry 508 may be configured in various ways. For example, each of the plurality of transmission paths 506-1 to 506-N may be connected to one antenna array. In another example, the plurality of transmission paths 506-1 to 506-N may be connected to one antenna array. In still another example, the plurality of transmission paths 506-1 to 506-N may be adaptively connected to one antenna array, or may be connected to two or more antenna arrays.

Figure 6:
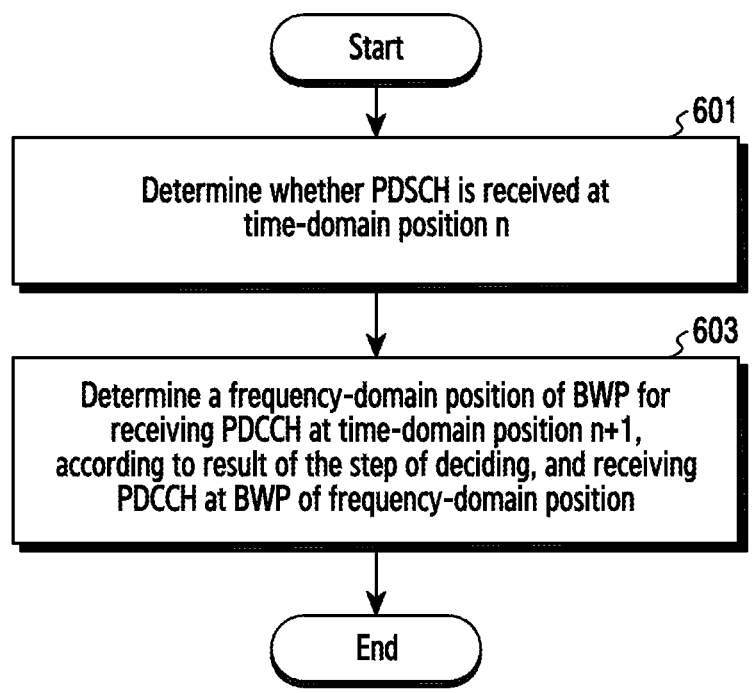
FIG. 6 is a flowchart of a method for receiving a downlink control channel according to embodiments of the disclosure.

FIG. 6 is a flowchart of a method for receiving a downlink control channel according to the disclosure.

Referring FIG. 6, in operation 601, a UE determines whether a PDSCH is received at a time-domain position n. In operation 603, the UE determines the frequency-domain position of the BWP for receiving a PDCCH at a time-domain position n+1, and receiving the PDCCH at the BWP of the frequency-domain position according to a result of the step of deciding.

The method for receiving a downlink control channel of the disclosure can be applied to a wireless communication system with limited bandwidth capability. The method for receiving a downlink control channel of the disclosure will be described by the following several embodiments.

Embodiment 1

This embodiment describes a process in which the UE determines the BWP where a PDCCH and a PDSCH are received, wherein, the PDCCH is used for transmitting downlink control information (DCI), and the PDSCH is used for transmitting data.

When the UE is configured with more than one BWPs, the bandwidth range of all BWPs configured for the UE exceeds the bandwidth capability of the UE due to the limited bandwidth capability, therefore, the UE cannot receive the PDCCH and PDSCH within a multiple of BWPs at the same moment; or, due to other reasons, the UE determines to detect and receive the PDCCH on one or more configured BWPs by receiving the configuration information of the base station, therefore, the UE cannot receive the PDCCH and PDSCH within a multiple of BWPs at the same moment. When the UE cannot receive the PDCCH and PDSCH within a multiple of BWPs at the same moment, here are several methods for the UE receiving the PDCCH in the following. In these methods, the BWP where the UE receives PDSCH is dynamically indicated through information field in the DCI.

Implementation Method 1

Figure 7:
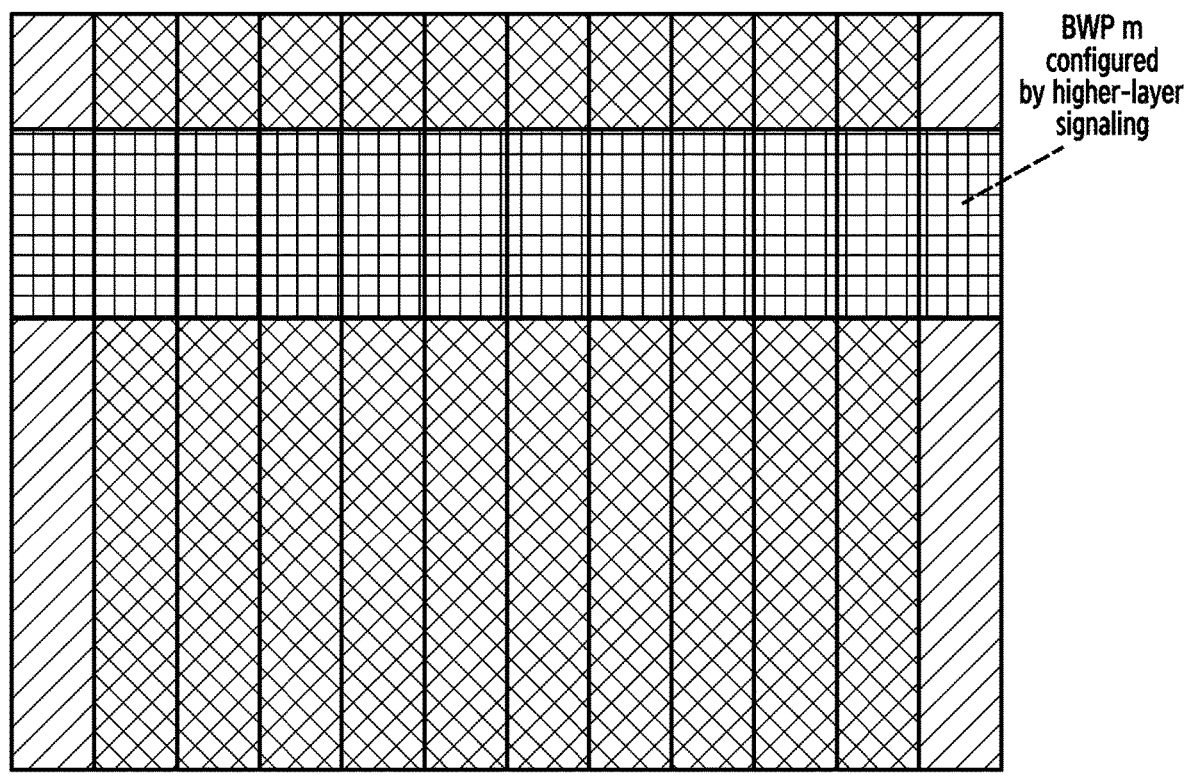
FIG. 7 is a schematic diagram of a BWP where a UE receives a physical downlink control channel (PDCCH) in implementation 1 of Embodiment 1 of the disclosure.

FIG. 7 is a schematic diagram of a BWP where a UE receives a physical downlink control channel (PDCCH) in implementation 1 of Embodiment 1 of the disclosure.

Referring to FIG. 7, the UE determines to detect and receive the PDCCH on one or more configured BWPs by receiving the higher-layer signaling configuration. In this case, the BWP where the UE detects and receives the PDCCH is possible to be the same as or different from the BWP where the PDSCH has previously been detected and received. When the BWP where the UE detects and receives the PDCCH is different from the BWP where the PDSCH has previously been detected and received, a time interval is required to adjust the frequency. Within this time interval, the UE cannot receive the DCI and the data correctly.

Implementation Method 2

Figure 8:
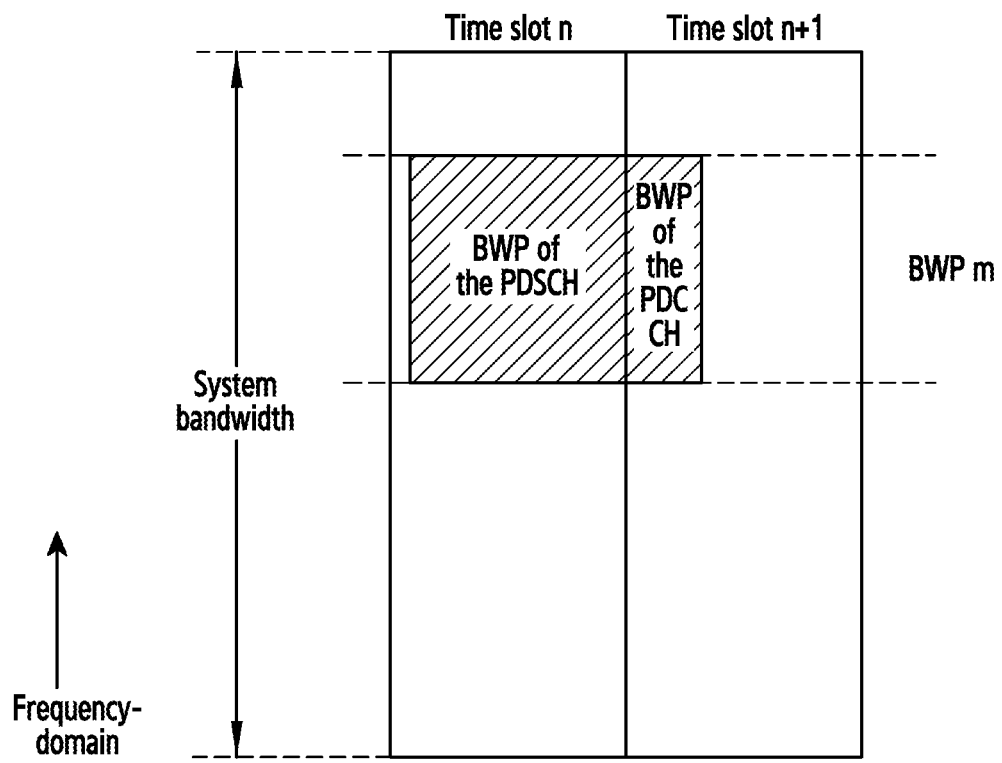
FIG. 8 is a schematic diagram of a BWP where a UE receives a PDCCH in case 1 in implementation 2 of Embodiment 1 of the disclosure.

FIG. 8 is a schematic diagram of a BWP where a UE receives a PDCCH in case 1 in implementation 2 of Embodiment 1 of the disclosure.

If the BWP where the UE detects the PDCCH is configured by the higher-layer signaling, the UE needs to frequently switch the BWPs to separately detect and receive the PDSCH and the PDCCH, thereby wasting resources. Therefore, the BWP where the UE detects the PDCCH needs to be configured to be dynamically variable.

For example, a method which can be used is that: if the BWP sequence number of the BWP where the UE receives the PDSCH in time slot n is m, the UE detects the PDCCH in time slot n+1 and on the BWP with BWP sequence number m, so that the UE does not need an interval time to adjust the frequency, which can save resources, as shown in FIG. 8.

Figure 9:
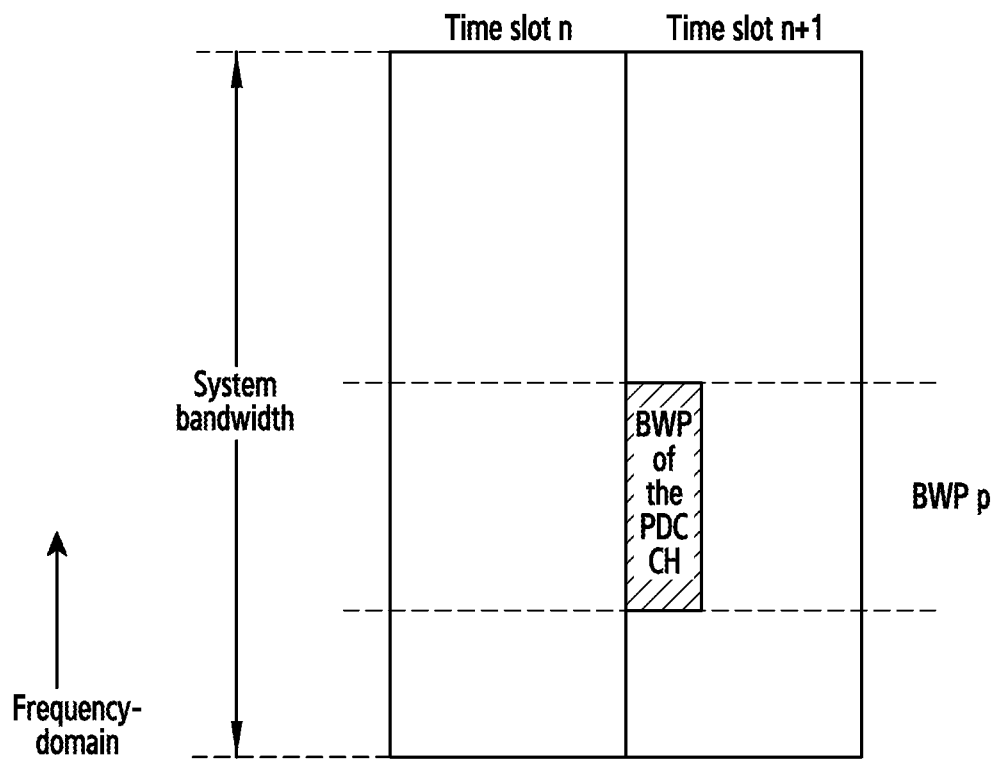
FIG. 9 is a schematic diagram of a BWP where a UE receives a PDCCH in case 2 in implementation 2 of Embodiment 1 of the disclosure.

FIG. 9 is a schematic diagram of a BWP where a UE receives a PDCCH in case 2 in implementation 2 of Embodiment 1 of the disclosure.

Figure 10:
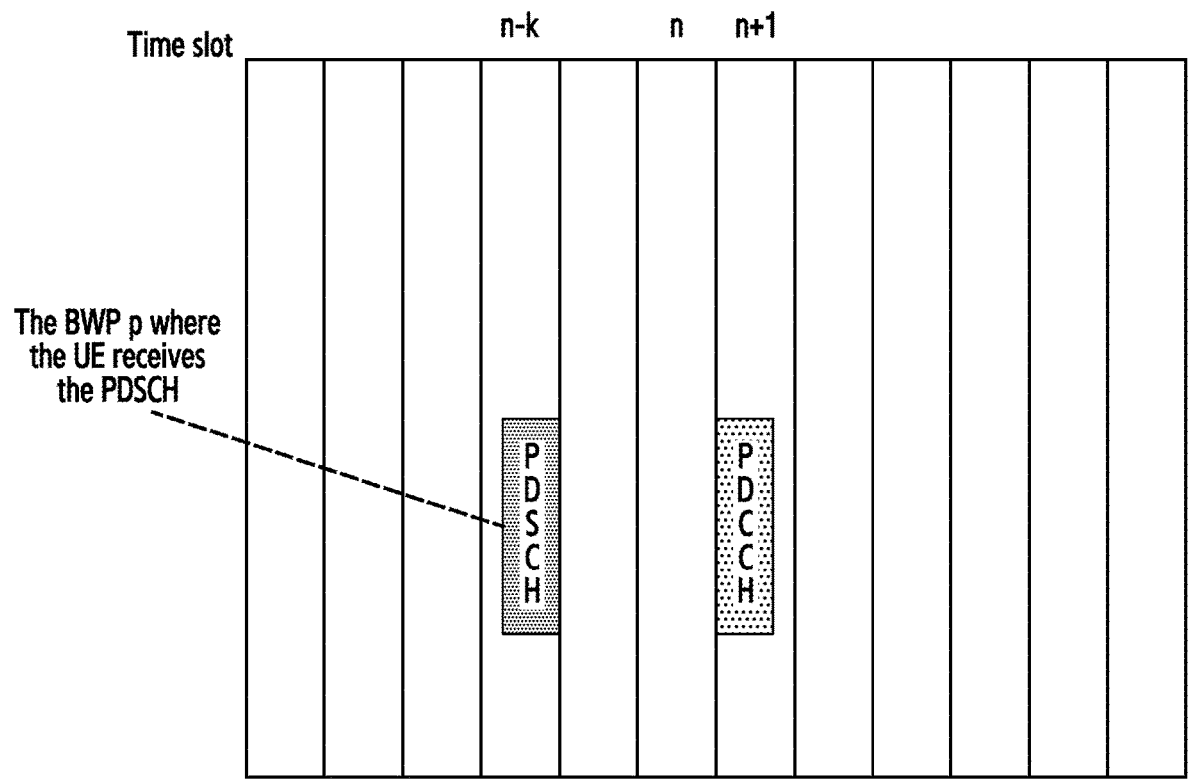
FIG. 10 is a schematic diagram of a BWP where a UE receives a PDCCH in case 3 in implementation 2 of Embodiment 1 of the disclosure.

FIG. 10 is a schematic diagram of a BWP where a UE receives a PDCCH in case 3 in implementation 2 of Embodiment 1 of the disclosure.

If the UE does not receive the PDSCH in the time slot n, the UE detects the PDCCH in time slot n+1 and on the BWP with BWP sequence number p, and p is determined by the signaling (for example, higher-layer signaling) of the base station received by the UE, as shown in FIG. 9. Or, if the UE does not receive the PDSCH in time slot n, the UE detects the PDCCH in time slot n+1 and on the BWP with BWP sequence number p, wherein, p is the BWP sequence number in the time slot which is preceding and closest to the time slot n and has ever received the PDSCH, if the PDSCH is not received before, then the UE determines the BWP sequence number p by receiving the signaling (such as the higher-layer signaling) of the base station, as shown in FIG. 10.

In such design, the latency and resource consumption of converting BWP by UE can be avoided as much as possible. In this case, the BWP where the UE detects the PDCCH can be the same as the BWP where the PDSCH has previously been received.

Implementation Method 3

Figure 11:
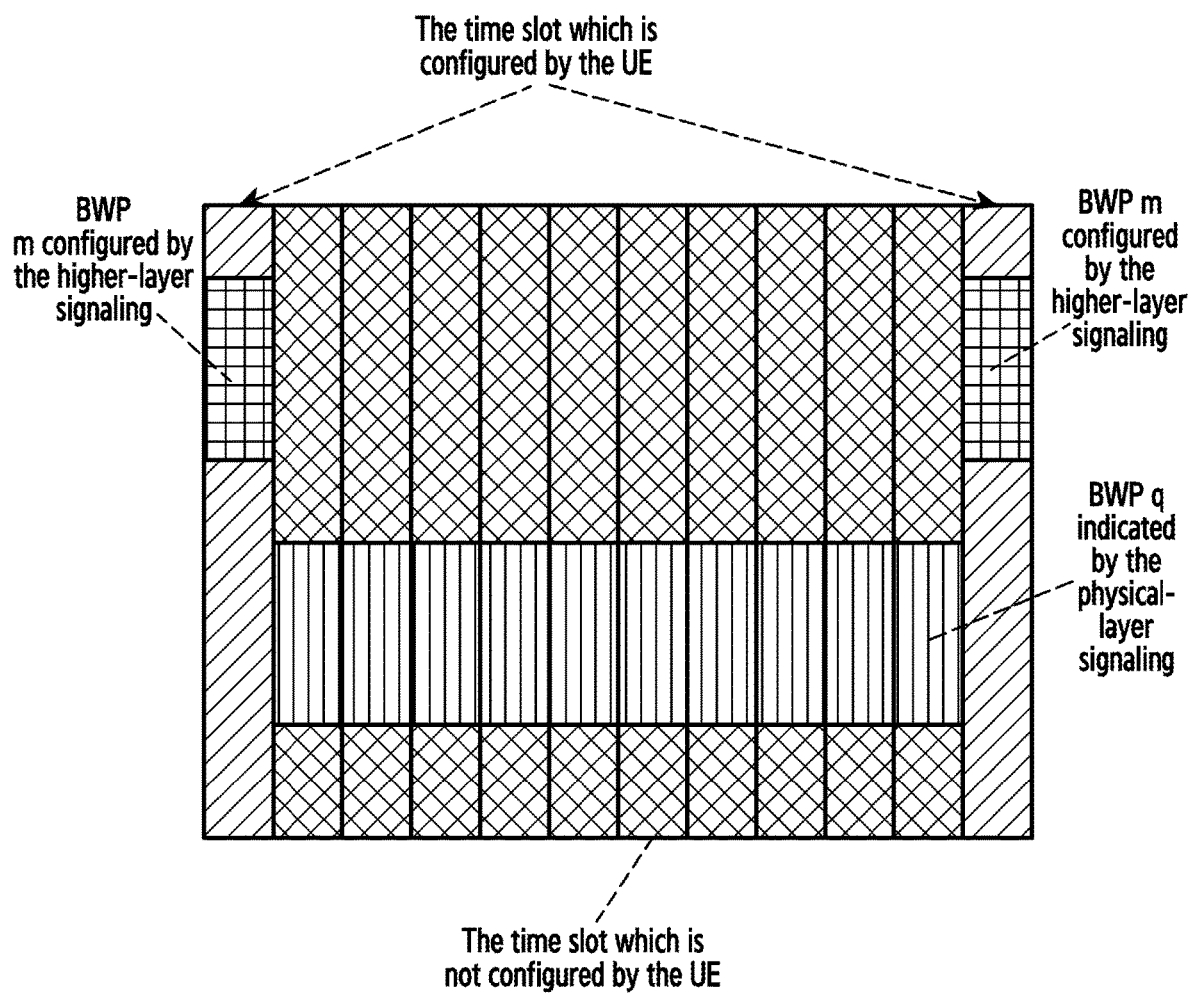
FIG. 11 is a schematic diagram of a BWP where a UE receives a PDCCH in implementation 3 of Embodiment 1 of the disclosure.

FIG. 11 is a schematic diagram of a BWP where a UE receives a PDCCH in implementation 3 of Embodiment 1 of the disclosure.

Please refer to FIG. 11. The UE detects and receives the PDCCH within a configured time slot and on a BWP configured by a high-layer signaling. For example, the UE detects the PDCCH on a BWP with a sequence number m configured by a higher-layer signaling within periodically distributed time slots, for example, within a first time slot of every 10 time slots; in other time slots, the BWP where the UE detects and receives the PDCCH can be dynamically variable, for example, the UE can detect the PDCCH on a BWP with a sequence number q which is indicated by a physical layer signaling or a media access control (MAC) layer signaling, and the physical layer signaling or the MAC layer signaling can be transmitted on the PDCCH of the BWP configured by the higher-layer signaling.

Implementation Method 4

The UE detects and receives the PDCCH within a configured time slot and on a BWP configured by a higher-layer signaling. For example, the UE detects the PDCCH on the BWP with the sequence number m configured by a higher-layer signaling within periodically distributed time slots, for example, within a first time slot of every 10 time slots; in other time slots, the BWP where the UE detects and receives the PDCCH can be dynamically variable. For example, the method described in implementation method 2 of Embodiment 1 can be used to determine the BWP where the UE detects the PDCCH in other time slots.

Figure 12:
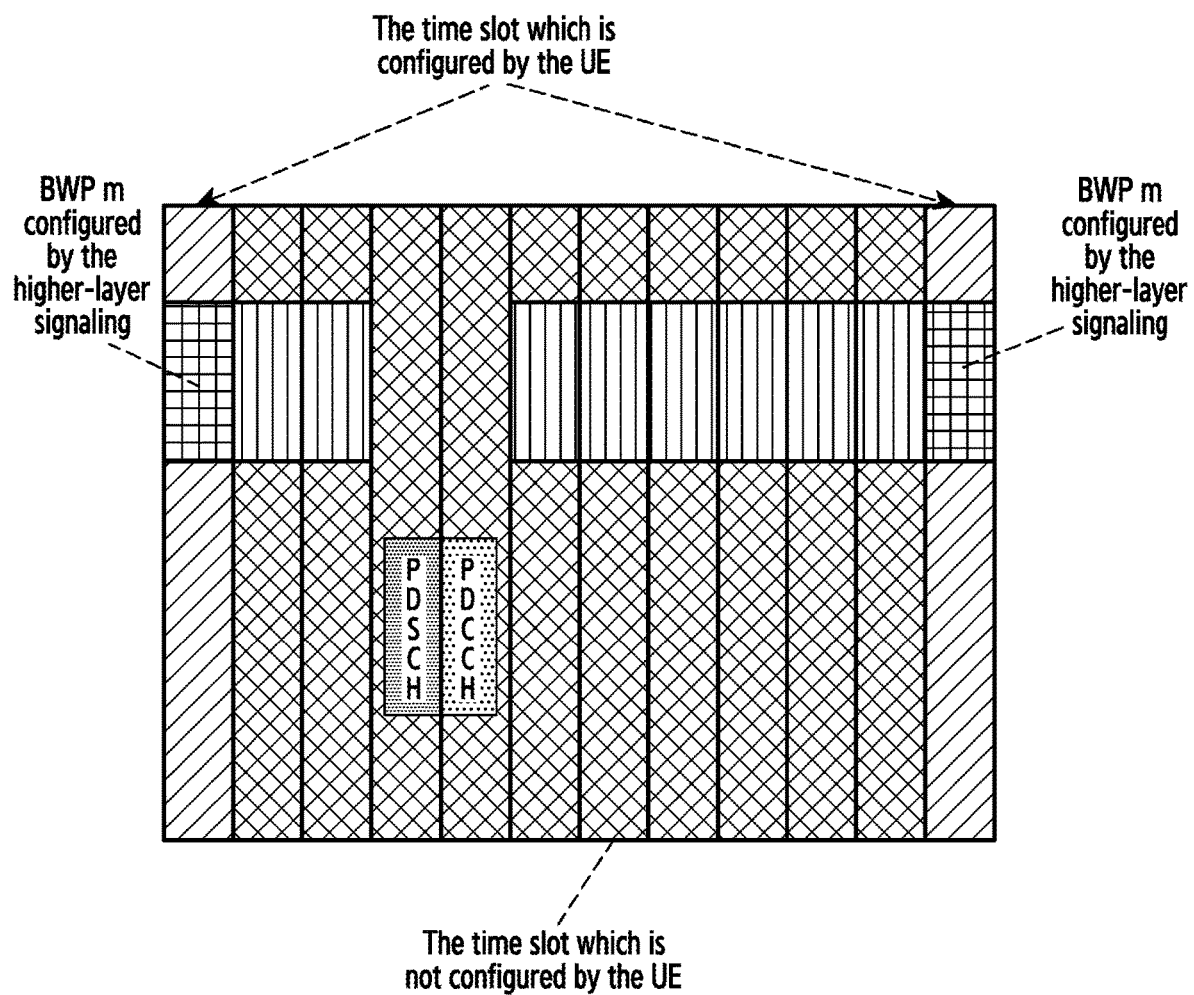
FIG. 12 is a schematic diagram of a BWP where a UE receives a PDCCH in implementation 4 of Embodiment 1 of the disclosure.

FIG. 12 is a schematic diagram of a BWP where a UE receives a PDCCH in implementation 4 of Embodiment 1 of the disclosure.

For example, if the BWP sequence number of the BWP where the UE receives the PDSCH in time slot n is h, the UE detects the PDCCH in time slot n+1 and on the BWP with the BWP sequence number h, so that the UE does not need an interval time to adjust the frequency and resources can be saved, as shown in FIG. 12. If the UE does not receive the PDSCH in time slot n, the UE detects the PDCCH in time slot n+1 and on the BWP with sequence number m configured by the higher-layer signaling. Or, if the UE does not receive the PDSCH in time slot n, the UE detects the PDCCH in time slot n+1 and on the BWP with BWP sequence number p, wherein p is the BWP sequence number in the time slot which is preceding and closest to the time slot n and has ever received the PDSCH. If the PDSCH is not received before, the UE determines the sequence number p of the BWP by receiving the signaling of the base station.

Implementation Method 5

The BWP where the UE receives the PDCCH is variable. Before the UE receives the physical layer signaling or MAC layer signaling indication to change the BWP where the UE detects the BWP, the UE maintains the BWP where the UE detects the PDCCH unchanged, for example, the UE configures two BWPs, and detects the PDCCH on BWP1 through the higher-layer signaling configuration. If the UE does not detect the PDCCH on the BWP with sequence number 2 of the physical layer signaling or MAC layer signaling indication, the UE always detects the PDCCH on BWP1. If the UE detects the PDCCH on the BWP with the BWP sequence number 2 of the physical layer signaling or MAC layer signaling indication, the UE detects the PDCCH on BWP2 until receiving a new physical layer signaling or MAC layer signaling indication. Or, the UE determines the BWP where the UE detects the PDCCH by measurement and reports to the base station.

Embodiment 2

Figure 13:
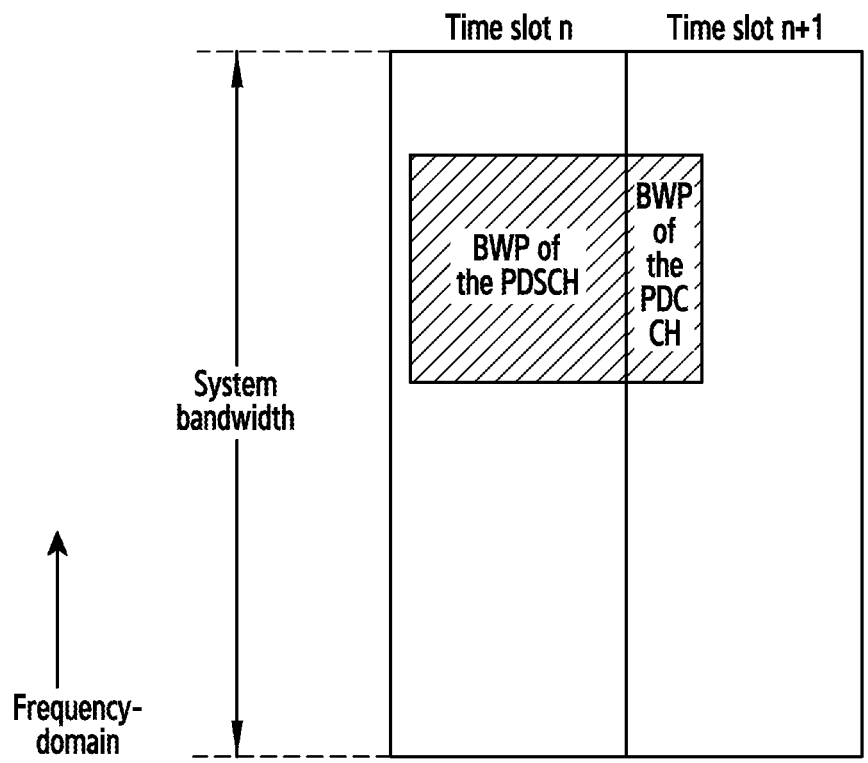
FIG. 13 is a schematic diagram that a UE receives a physical downlink shared channel (PDSCH) and a PDCCH at the same frequency-domain position according to embodiments of the disclosure.

FIG. 13 is a schematic diagram that a UE receives a PDSCH and a PDCCH at the same frequency-domain position according to embodiments of the disclosure.

Figure 14:
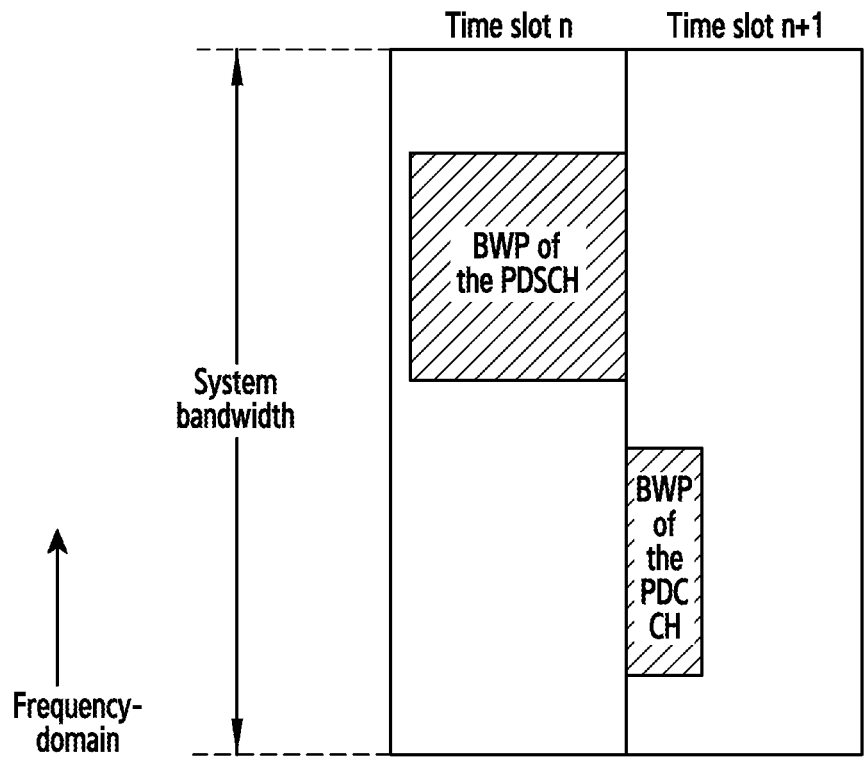
FIG. 14 is a schematic diagram that a UE receives a PDSCH and a PDCCH at different frequency-domain positions according to embodiments of the disclosure.

FIG. 14 is a schematic diagram that a UE receives a PDSCH and a PDCCH at different frequency-domain positions according to embodiments of the disclosure.

When the UE detects and receives PDSCH in time slot n and detects and receives PDCCH in time slot n+1, the BWP where the UE detects and receives PDCCH can be the same as (as shown in FIG. 13) or different form (as shown in FIG. 14) the BWP where the PDSCH is previously detected and received. When the BWP where the UE detects the PDCCH is different from the BWP where the PDSCH has previously been detected (for example, in the cases of implementation methods 1 and 3 of Embodiment 1), a time interval is required to adjust the frequency, and the UE cannot receive the DCI and data within this time interval correctly. This embodiment introduces several processing methods in the above case, that is, when the UE needs to have a time interval to adjust the receiving frequency between two time slots.

Implementation Method 1

Figure 15:
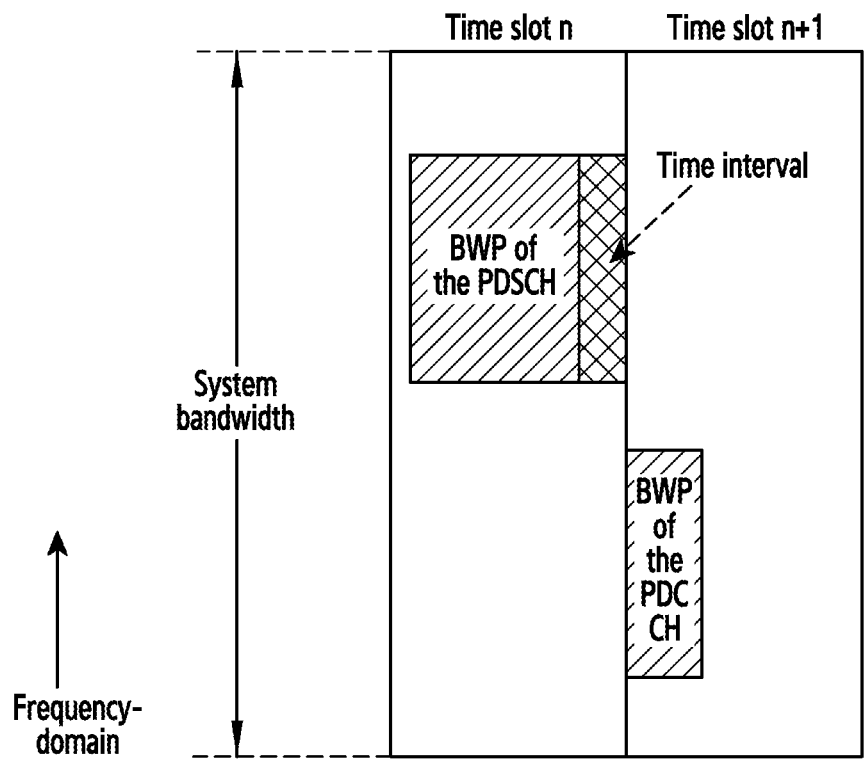
FIG. 15 is a schematic diagram of a BWP where a UE receives the PDCCH in implementation 1 of Embodiment 2 of the disclosure.

FIG. 15 is a schematic diagram of a BWP where a UE receives the PDCCH in implementation 1 of Embodiment 2 of the disclosure.

Please refer to FIG. 15. One processing method is that: if the UE receives the PDSCH in time slot n and wants to detect the PDCCH in time slot n+1, the UE does not receive the PDSCH at the posterior part of the time-domain position for receiving the PDSCH, for example, within the last L OFDM symbols of time slot n (L is a positive integer, which is configured by higher-layer signaling or predetermined by an agreed rule). In this way, the changes to the prior art are relatively small, because the positions of the reference symbols of the PDSCH can maintain the same.

Implementation Method 2

Figure 16:
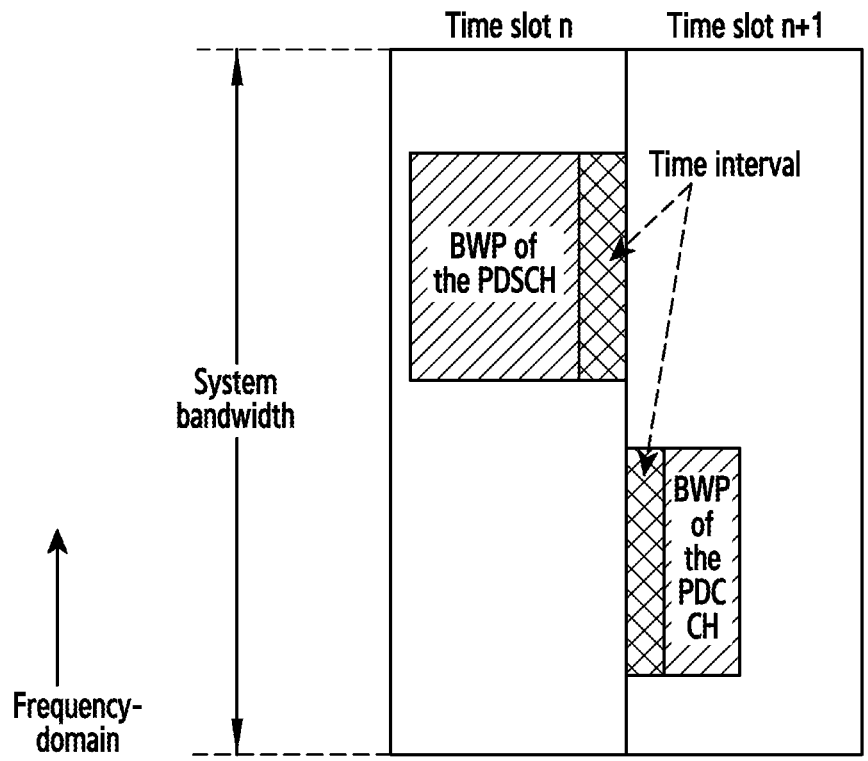
FIG. 16 is a schematic diagram of a BWP where a UE receives the PDCCH in implementation 2 of Embodiment 2 of the disclosure.

FIG. 16 is a schematic diagram of a BWP where a UE receives the PDCCH in implementation 2 of Embodiment 2 of the disclosure.

Please refer to FIG. 16. Another processing method is that: if the UE receives the PDSCH in time slot n and needs to detect the PDCCH in time slot n+1, the UE does not receive the PDSCH at the posterior part of the time-domain position for receiving the PDSCH, for example, within the last P OFDM symbols of time slot n (P is a positive integer, which is configured by higher-layer signaling or predetermined by an agreed rule), and meanwhile the UE detects the PDCCH at the posterior part of the time-domain position where the PDCCH is detected, for example, receives the PDCCH starting from the first $(Q+1)^{th}$ OFDM symbols (Q is a positive integer, which is configured by the higher-layer signaling or predetermined by an agreed rule) of the time slot n+1. In this way, the time interval can be evenly distributed within two time slots, and the effect on the PDCCH and the PDSCH is relatively small. However, the position of the reference symbol of the PDCCH is possible to need to be changed.

Implementation Method 3

Figure 17:
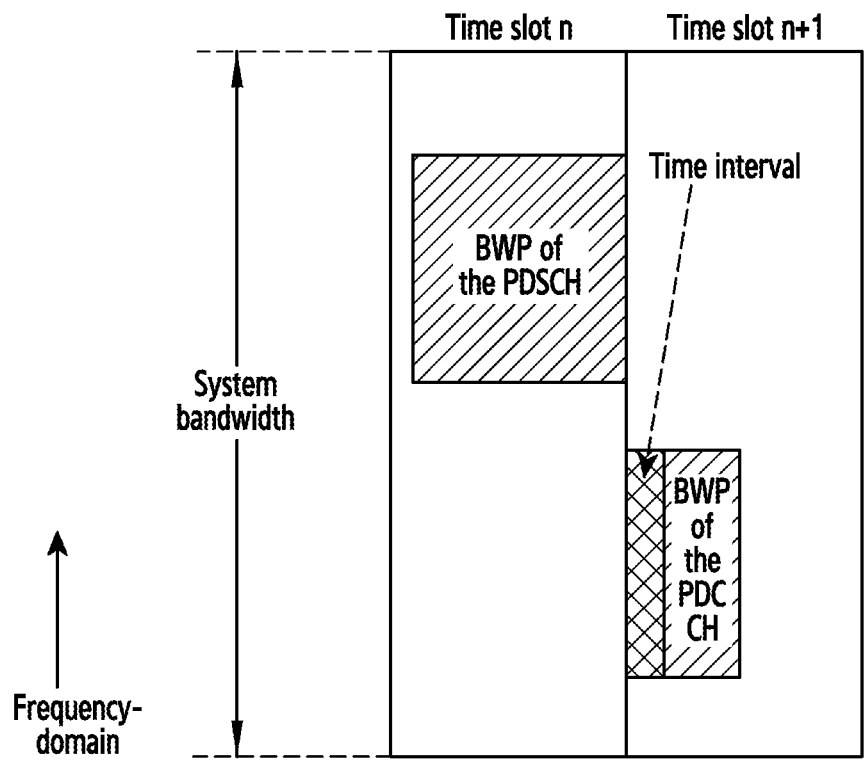
FIG. 17 is a schematic diagram of a BWP where a UE receives the PDCCH in implementation 3 of Embodiment 2 of the disclosure.

FIG. 17 is a schematic diagram of a BWP where a UE receives the PDCCH in implementation 3 of Embodiment 2 of the disclosure.

Please refer to FIG. 17. Another processing method is that, if the UE receives the PDSCH in time slot n and needs to detect the PDCCH in time slot n+1, the UE detects the PDCCH at the posterior part of the time-domain position where the PDCCH is detected, for example, detects the PDCCH starting from the first $(Q+1)^{th}$ OFDM symbols (Q is a positive integer, which is configured by higher-layer signaling or predetermined by protocol) of the time slot n+1. In this way, even if the UE does not detect the PDCCH within the time slot n+1, the reception of the PDSCH in time slot n is not affected. However, the position of the reference symbol of the PDCCH is possible to need to be changed.

Embodiment 3

This embodiment provides another method for receiving a PDCCH by a UE.

Implementation Method 1

First, the UE determines that it is necessary to receive the PDCCH in time slot n. Then, the UE determines that time slot n−k should satisfy the following conditions: (1) the time slot n−k is closest to the time slot n; and (2) the UE has received the PDSCH in the time slot n−k. Finally, the UE detects the PDCCH in the time slot n and on the BWP with the BWP sequence number p, where p is the BWP sequence number of the BWP where the UE has received the PDSCH in the time slot n−k.

Implementation Method 2

First, the UE determines that it is necessary to receive the PDCCH in time slot n. Then, the UE determines whether there is a time slot n−k (k is a positive integer) preceding the time slot n, and the time slot n−k satisfies the following conditions: (1) the time slot n−k is closest to the time slot n; (2) the UE has received the PDSCH in the time slot n−k. If the UE determines that there is no time slot n−k, the UE detects the PDCCH in time slot n and on the BWP with the BWP sequence number p, and p is determined by the signaling (for example, higher-layer signaling, MAC layer signaling or physical layer signaling) of the base station received by the UE. If the UE finds the time slot n−k, the UE detects the PDCCH in the time slot n and on the BWP with the BWP sequence number p, wherein, p is the BWP sequence number of the BWP where the UE receives the PDSCH in the time slot n−k.

Implementation Method 3

The UE detects and receives the PDCCH within a configured time slot and on a BWP configured by a higher-layer signaling. For example, the UE detects a PDCCH on a BWP with a sequence number m configured by a higher-layer signaling within periodically distributed time slots, for example, in a first time slot of every 10 time slots; in other time slots, the BWP where the UE detects and receives the PDCCH is dynamically variable, for example, the method described in implementation method 1 or 2 of Embodiment 3 can be used to determine the BWP where the UE detects the PDCCH in other time slots.

Figure 18:
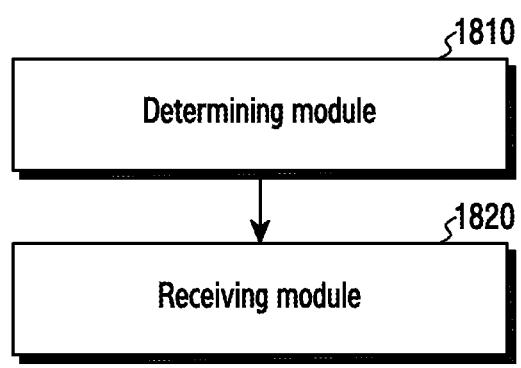
FIG. 18 is a block diagram of modules of a UE for receiving a downlink control channel according to the disclosure.

FIG. 18 is a block diagram of modules of a UE for receiving a downlink control channel according to the disclosure.

Referring to FIG. 18, a UE for receiving a downlink control channel according to the disclosure, comprises:

a determining module 1810, configured to decide whether is received a PDSCH at a time-domain position n;

a receiving module 1820, configured to determine, according to a decision of the determining module 1810, the frequency-domain position of the BWP for receiving a PDCCH at a time-domain position n+1, and receiving the PDCCH at the BWP of the frequency-domain position.

The operating processes of the determining module 1810 and the receiving module 1820 respectively correspond to embodiments 101 and 102 of the method for receiving a downlink control channel according to the disclosure, and details are not described herein again.

With reference to the above detailed disclosure of the disclosure, it can be seen that, compared with the prior art, the disclosure has at least the following beneficial technical effects:

First, the disclosure determines the frequency-domain position of the BWP for receiving the PDCCH by determining whether it is necessary to receive the PDSCH at the time-domain position preceding the current time-domain position for receiving the PDCCH, greatly reducing or even eliminating the influence of the adjustment time interval for the UE to convert the BWP on the normal data reception of the UE, which ensures the receiving performance and the throughput level of the received data of the UE.

Second, by dynamically configuring the position of BWP where the PDCCH is received, a case that the position of the BWP where the PDCCH is received is different from the BWP where the PDSCH is received at the previous time-domain position is avoided, an adjustment time interval required for the UE to convert the BWP is avoided, the integrity of the received data is ensured, meanwhile, the transmission resources is saved and the communication efficiency of the system is improved.

Thirdly, even when the PDSCH is not received in the previous time-domain position where the PDCCH is received, a solution is provided to minimize the latency and resource consumption required for the UE to convert the BWP, thereby reducing the power consumption of the UE to some extent.

Fourthly, in the case of inevitable BWP conversion, by configuring the time-domain position where the UE receives the PDSCH or the PDCCH to further ensure that the received data is not affected by the adjustment time of BWP conversion, thereby remarkably increasing the reliability of the data received by the UE.

Transmission in a radio communication system includes transmission from a base station (gNB) to a user equipment (UE) (referred to as downlink transmission), with a corresponding time slot being referred to as a downlink time slot, and transmission from the UE to the base station (referred to as Uplink transmission), with the corresponding time slot being referred to as uplink time slot.

In the downlink communication of the radio communication system, the reliability of the receipt of downlink data is ensured by Hybrid Automatic Repeat reQuest (HARQ) technology. The downlink data is transmitted by the base station to the UE through a Physical Downlink Shared Channel (PDSCH), and the UE informs the base station whether the UE correctly receives the PDSCH or not by transmitting Hybrid Automatic Repeat Request-Acknowledgement (HARQ-ACK) feedback information, which is transmitted by the UE through a Physical Uplink Control Channel (PUCCH) to the base station.

For each Transmission Block (TB) of the received PDSCH, or the received Physical Downlink Control Channel (PDCCH) indicating SPS (Semi-Persistent Scheduling) release (both Generally referred to as downlink HARQ transmission), the UE needs to feed back ACK (Correctly Received) bits or NACK (Error Received or Lost) bits (hereinafter collectively referred to as HARQ-ACK bits) to the base station by corresponding uplink subframes. If the gNB receives the NACK bits, the TBs corresponding to the NACK or the PDCCH indicating the SPS release will be retransmitted.

When the UE transmits the HARQ-ACK feedback information through the PUCCH, the UE needs to know the PUCCH resources for transmitting the HARQ-ACK. The PUCCH for transmitting the HARQ-ACK may be obtained through an implicit manner or an explicit manner. In the implicit manner, the PDCCH is obtained by mapping the index of the lowest Control Channel Element (CCE) of the Physical Downlink Control Channel (PDCCH) scheduling the PDSCH. In the explicit manner, a group of PUCCH resources are configured by a higher layer signaling, and a field of the Downlink Control Information (DCI) (this field is referred to as an HARQ-ACK resource indicator, ARI, HARQ-ACK Resource Indicator) is scheduled to indicate PUCCH resources of the group of PUCCH resources configured by the higher layer signaling.

In a New Radio (NR) communication system, before establishment of radio resource control, that is, before the higher layer does not configure PUCCH resource set for a UE to transmit the HARQ-ACK, it is impossible to indicate the PUCCH resources through the ARI field in the DCI of the PDCCH for scheduling the PDSCH. Currently, there exists no an ideal solution as to how to indicate the PUCCH resources of the HARQ-ACK.

In order to make the purpose, technical means and advantages of the present application clearer, the present application will be further described in detail with reference to the accompanying drawings.

After establishing an Radio Resource Control (RRC) connection, a UE may receive a PUCCH set configured by a UE-specific high-layer signaling, and then the ARI in the PDCCH indicates one PUCCH resource in the set to transmit HARQ-ACK. The PUCCH resources in this set are shared by a group of UEs in the serving cell. If UEs are more in the serving cell, they may be divided into multiple groups so that the number of users in each group will not be too large. This PUCCH set is shared within one group, and the ARI only indicates one PUCCH resource in the group. Therefore, the number of ARI bits will not be too large. At this time, the number of the ARI bits may be a certain value, for example, 2, when the PUCCH set configured by each high-layer signaling includes 4 PUCCH resources. However, before establishing the RRC connection, the PUCCH set determined by the indication in the broadcasted Reserved Minimum System Information (RMSI) is for all UEs in the serving cell, and cannot be grouped according to the number of users of the serving cell. For example, the PUCCH resources of the HARQ-ACK information of the PDSCH of message 4 is determined before the establishment of the RRC connection.

When the PUCCH resources for transmitting the HARQ-ACK feedback information is obtained by combining the received UE-specific high-layer signaling configuration with physical layer information, the mode is referred to as a first PUCCH resource indication mode. When the UE obtains the PUCCH resources for transmitting the HARQ-ACK feedback information by combining the received broadcast information with the physical layer information, the mode is referred to as a second PUCCH resource indication mode.

Figure 19:
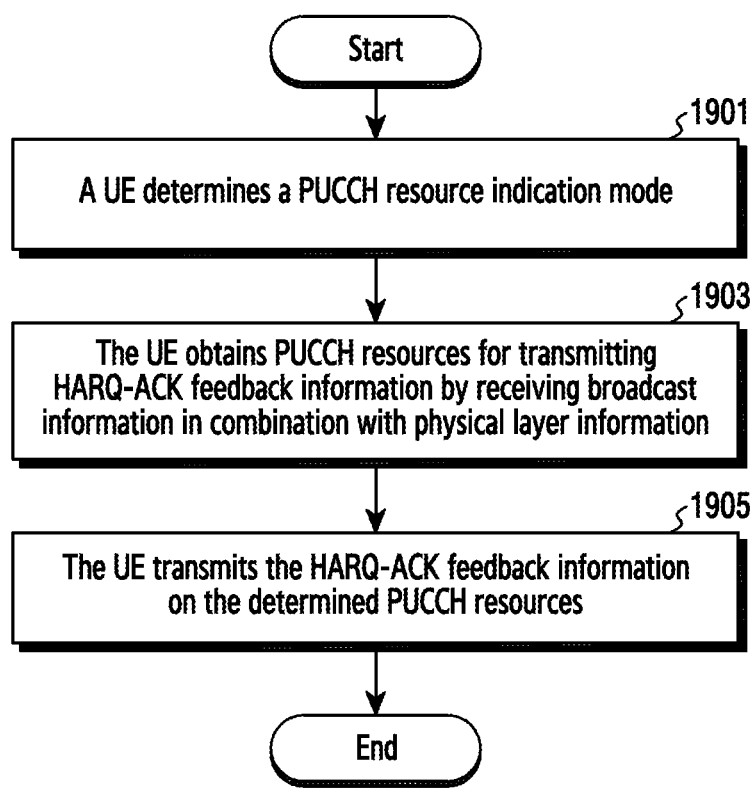
FIG. 19 is a basic flow chart of a method for HARQ-ACK feedback according to the present application.

To solve this problem, the present application proposes a method for HARQ-ACK information feedback. As shown in FIG. 19, the most basic method for HARQ-ACK information feedback in the present application includes the following steps:

Step 1901: A UE determines a PUCCH resource indication mode.

Where, there are two PUCCH resource indication modes, which are the first PUCCH resource indication mode and the second PUCCH resource indication mode.

Step 1903: The UE obtains PUCCH resources for transmitting HARQ-ACK feedback information by receiving broadcast information in combination with physical layer information.

Wherein, the UE obtains the PUCCH resource set transmitting the HARQ-ACK feedback information by receiving the broadcast information.

Preferably, the broadcast information may be information in a RMSI.

Preferably, multiple PUCCH resource sets may be determined through a protocol, and then the bits of the RMSI indicate one of the PUCCH resource sets to be used for user to transmit the HARQ-ACK in the serving cell.

Preferably, the PUCCH resource set indicated by the RMSI includes one or more PUCCH resources in different formats or a same format. Herein, the PUCCH format may include PUCCH format 0 and PUCCH format 1.

Preferably, the number of PUCCH resources included in different PUCCH resource sets indicated by the RMSI may be different or the same. For example, the number of PUCCH resources included in the PUCCH resource set may be 4, 8, 16, 32, 64, and the like.

Then, the UE selects one PUCCH resource from the PUCCH resource set to transmit HARQ-ACK feedback information by receiving PUCCH resource indication information in the PDCCH scheduling the PDSCH.

Preferably, the PUCCH resources transmitting the HARQ-ACK feedback information may be jointly determined by an RMSI indication and a physical layer signaling indication.

In more detail, the UE may first determine one or more PUCCH resource sets in different formats or the same format by receiving the RMSI, and then determine one PUCCH resource from the PUCCH resource sets as HARQ-ACK transmission resources by receiving a physical layer signaling (eg, ARI in PDCCH scheduling PDSCH). For example, the UE of one serving cell determines PUCCH resource set S1 by receiving the RMSI. The set S1 includes 8 PUCCH resources, namely {s1, s2, s3, s4, s5, s6, s7, s8}, and specific parameters (for example, a parameters including a PUCCH format of each PUCCH resource, a location of physical resource blocks occupied by each PUCCH resource, a location and a number of OFDM symbols occupied by each PUCCH resource, and the like) of each PUCCH resource in the set is preset by a protocol, and the specific parameters of each PUCCH resource may be the same or different, and the format of each PUCCH resource in the same set may be the same or different. The UE of another serving cell determines one PUCCH resource set S2 by receiving the RMSI, and the set S2 includes four PUCCH resources, namely {s1, s2, s3, s4}. The specific parameters of each PUCCH resource in the set are preset by a protocol, and the specific parameters of each PUCCH resource may be the same or different, and the format of each PUCCH resource in the same set may be the same or different.

The physical layer signaling used to indicate the PUCCH resources is referred to as PUCCH resource indication information, and the PUCCH resource indication information may include only bit information of the ARI field, and may also be information indicated jointly by bits of the ARI field and bits of other fields, for example, by 2 bits of ARI and 2 bits of DAI (total 4 bits) are used as PUCCH resource indication information.

Preferably, the number of bits of the PUCCH resource indication information is preset by the protocol. For example, the PUCCH resource indication information is 3 bits.

Preferably, the number of bits of the PUCCH resource indication information is determined by the number of resources in the PUCCH resource sets indicated by RMSI. For example, PUCCH resource set S1 includes 8 PUCCH resources, PUCCH resource indication information is 3 bits, and PUCCH resource set S2 includes 4 PUCCH resources and the PUCCH resource indication information is 2 bits.

Preferably, the PUCCH resource indication information of the physical layer signaling used for indicating the PUCCH resources may be a separate field, such as an ARI field.

Preferably, the PUCCH resource indication information of the physical layer signaling used for indicating the PUCCH resources may be a combination of other fields reused and the ARI field, and other fields may include a HARQ-ACK timing relationship indication field, a Downlink Assignment Indicator (DAI) field, an indication field of the number of HARQ processes, and the like.

Step 1905: The UE transmits the HARQ-ACK feedback information on the determined PUCCH resources.

It should be particularly noted that the present application does not limit the sequence in which the UE performs the above step 110, step 120 and step 130, and the solution obtained after the adjustment of the sequence is performed on one or more of the above three steps is still within the scope of this application.

In order to facilitate understanding of the present application, the above technical solution of the present application are further described in terms of the interaction mode between devices in combination with specific applications as follows:

Embodiment 1

In this embodiment, the number of bits of PUCCH resource indication information used to indicate PUCCH resources in a PDCCH received by a UE is preset by a protocol. The specific steps of HARQ-ACK transmission in the embodiment are as follows:

Step 210: A UE determines a PUCCH resource set for transmitting HARQ-ACK feedback information by receiving an indication in a RMSI.

N-bit information may be used in the RMSI to indicate the PUCCH resource set for transmitting the HARQ-ACK feedback information.

For example, 4-bit information in the RMSI indicates up to 16 PUCCH resource sets, as shown in Table 1, where the 4-bit information in the RMSI may be referred to as R-ARI, i.e., the ARI in the RMSI. The number of PUCCH resources in each resource set is preset by the protocol.

TABLE 1

Mapping from A-ARI field to PUSCH resource set

| R-ARI MSB, LSB | PUCCH resource set | Number of PUCCH resources (preset by protocol) |
|---|---|---|
| 0000 | PUCCH resource set s1 | 8 |
| 0001 | PUCCH resource set s2 | 8 |
| 0010 | PUCCH resource set s3 | 8 |
| 0011 | PUCCH resource set s4 | 8 |
| 0100 | PUCCH resource set s5 | 8 |
| 0101 | PUCCH resource set s6 | 8 |
| 0110 | PUCCH resource set s7 | 8 |
| 0111 | PUCCH resource set s8 | 8 |
| 1000 | PUCCH resource set s9 | 8 |
| 1001 | PUCCH resource set s10 | 8 |
| 1010 | PUCCH resource set s11 | 8 |
| 1011 | PUCCH resource set s12 | 8 |
| 1100 | PUCCH resource set s13 | 8 |
| 1101 | PUCCH resource set s14 | 8 |
| 1110 | PUCCH resource set s15 | 8 |
| 1111 | PUCCH resource set s16 | 8 |

The parameters of each PUCCH resource in each resource set are preset by the protocol. For example, the parameters of one PUCCH resource set are shown in Table 2.

TABLE 2

Mapping from ARI field to PUCCH resource within one resource set

| PUCCH resource indication information MSB, LSB | PUCCH format | Number of OFDM symbols | PRB |
|---|---|---|---|
| 000 | PUCCH format 0 | 1 | PRB 0 |
| 001 | PUCCH format 0 | 1 | PRB 1 |
| 010 | PUCCH format 0 | 2 | PRB 0 |
| 011 | PUCCH format 0 | 2 | PRB 1 |
| 100 | PUCCH format 1 | 10 | PRB 0 |
| 101 | PUCCH format 1 | 10 | PRB 1 |
| 110 | PUCCH format 1 | 14 | PRB 0 |
| 111 | PUCCH format 1 | 14 | PRB 1 |

The number of resources in a PUCCH resource set for transmitting HARQ-ACK configured by a UE-specific high-layer signaling may be different from the number of resources in a PUCCH resource set for transmitting HARQ-ACK indicated by RMSI, for example, the number of resources in the PUCCH resource set for transmitting the HARQ-ACK configured by the UE-specific high-layer signaling is 4, and the number of resources in one PUCCH resource set for transmitting the HARQ-ACK indicated by the RMSI is 8.

Step 220: The UE determines PUCCH resources for transmitting HARQ-ACK.

The UE obtains the PUCCH resources for transmitting the HARQ-ACK by receiving the PUCCH resource indication information in the PDCCH for scheduling the PDSCH. As the number of resources in the PUCCH resource set for transmitting the HARQ-ACK configured by the UE-specific higher layer signaling may be different from the number of resources in the PUCCH resource set used to transmit the HARQ-ACK indicated by the RMSI, the number of bits of the indication information indicating the PUCCH resources in different types of PUCCH resource sets may be different. There are two methods to determine the PUCCH resource indication information below.

Method One:

The numbers of bits of Downlink Control Information (DL DCI) in the PDCCHs including the PUCCH resource indication information may be the same, and the numbers of bits of the indication information used to indicate the PUCCH resources in the different types of PUCCH resource sets may be different. For example, the DL DCI includes M bits, where 2 bits are ARIs, 4 bits are the indication field of the number of the HARQ processes, and the total are up to M bits including the other fields. When the PUCCH resources in the PUCCH resource set for transmitting the HARQ-ACK configured by the UE-specific higher layer signaling are indicated, 2 bits of the ARI are used to indicate one PUCCH resource among the 4 PUCCH resources in the PUCCH resource set for transmitting the HARQ-ACK configured by the UE-specific high-layer signaling, which is referred to as a first PUCCH resource indication mode.

For example, the DL DCI contains M bits, where 2 bits are ARIs, 4 bits are the indication field of the number of HARQ processes, and the total is M bits including the other fields. When the PUCCH resources in one PUCCH resource set for transmitting the HARQ-ACK are indicated by the RMSI, 3 bits including 2 bits of the ARI and 1 bit for indicating the number of HARQ processes are all used as the PUCCH resource indication information to indicate one of the 8 PUCCH resources in the PUCCH resource set for transmitting the HARQ-ACK indicated by the RMSI, which is called a second PUCCH resource indication mode.

As the first PUCCH resource indication mode and the second PUCCH resource indication mode have the same number of bits of DCI, the indication mode of the PUCCH resources may be determined as follows.

a: The PUCCH resource indication mode may be determined according to the type of the search space (SS) of DCI. For example, the DCI in the UE-specific SS adopts the first PUCCH resource indication mode, and the DCI in the common SS adopts the second PUCCH resource indication mode.

b: The PUCCH resource indication mode may also be determined according to the type of the Radio Network Temporary Identity (RNTI) of the DCI. For example, the DCI scrambled by the user RNTI (C-RNTI) adopts the first PUCCH resource indication mode.

c: Alternatively, the PUCCH resource indication mode may be jointly determined according to the type of the search space of the DCI and the type of the RNTI of the DCI. For example, only the DCI in the common SS and scrambled by the TC-RNTI adopts the second PUCCH resource indication mode, and the DCI in other cases adopts the first PUCCH resource indication mode.

d: Alternatively, the PUCCH resource indication mode is determined according to the format type of the DCI. For example, the normal DCI format (DCI format 1-1) adopts the first PUCCH resource indication mode, and the fall-back DCI format (DCI format 1-0) adopts the second PUCCH resource indication mode.

Method Two:

As the numbers of bits of the indication information of the PUCCH resources in the different types of PUCCH resource sets are different, the numbers of bits of DCI in the PDCCHs including the PUCCH resource indication information may be different. For example, when the PUCCH resources in the PUCCH resource set for transmitting the HARQ-ACK configured by the UE-specific high-layer signaling are indicated, there are four PUCCH resources in the PUCCH set, with 2-bit ARI is used to indicate one of the four PUCCH resources in the PUCCH resource set for transmitting the HARQ-ACK configured by the UE-specific high-layer signaling, which is referred to as a first PUCCH resource indication mode.

For example, when the PUCCH resources in one PUCCH resource set for transmitting the HARQ-ACK are indicated by the RMSI, 3-bit ARI is used to indicate one of the 8 PUCCH resources in the PUCCH resource set for transmitting the HARQ-ACK indicated by the RMSI, which is called a second PUCCH resource indication mode.

As the numbers of bits of the DCI used in the first PUCCH resource indication mode and the second PUCCH resource indication mode are different, the way of indicating the PUCCH resources may be determined as follows.

a: The number of bits for DCI blind detection may be determined according to the type of the search space (SS, Search space), and then the PUCCH resource indication mode may be determined. For example, the number of bits of DCI blind detection in the UE-specific SS is (N+2, where N is the total number of bits of the other fields except the ARI in the DCI), and the DCI adopts the first PUCCH resource indication mode. The number of bits of DCI blind detection in the common SS is (N+3, where N is the total number of bits of the other fields except the ARI in the DCI), and the DCI adopts the second PUCCH resource indication mode.

b: The PUCCH resource indication mode may also be determined according to the type of the Radio Network Temporary Identity (RNTI). For example, the DCI scrambled by the user RNTI (C-RNTI) adopts the first PUCCH resource indication mode, and the DCI scrambled by the temporary user RNTI (TC-RNTI) adopts the second PUCCH resource indication mode.

c: The PUCCH resource indication mode is determined according to the format type of the DCI. For example, the normal DCI format (DCI format 1-1) adopts the first PUCCH resource indication mode, and the fall-back DCI format (DCI format 1-0) adopts the second PUCCH resource indication mode.

d: The PUCCH resource indication mode is jointly determined according to the type of the search space and the type of the RNTI. For example, only the DCI in the common SS and scrambled by the TC-RNTI adopts the second PUCCH resource indication mode, and the DCI in other cases adopts the first PUCCH resource indication mode.

Embodiment 2

In this embodiment, the number of bits used to indicate ARI field of PUCCH resources in a PDCCH received by a UE may vary. The specific steps of HARQ-ACK transmission in the embodiment are as follows:

Step 310: A UE determines a PUCCH resource set for transmitting HARQ-ACK feedback information by receiving an indication in a RMSI.

N-bit information may be used in the RMSI to indicate the PUCCH resource set for transmitting the HARQ-ACK feedback information.

For example, 4-bit information in the RMSI indicates up to 16 PUCCH resource sets, as shown in Table 3, where the 4-bit information in the RMSI may be referred to as R-ARI, i.e., the ARI in the RMSI. The number of PUCCH resources in each resource set is preset by the protocol and may be different.

TABLE 3

Mapping from A-ARI field to PUCCH resource set

| R-ARI MSB, LSB | PUCCH resource set | Number of PUCCH resources |
|---|---|---|
| 0000 | PUCCH resource set s1 | 4 |
| 0001 | PUCCH resource set s2 | 4 |
| 0010 | PUCCH resource set s3 | 4 |
| 0011 | PUCCH resource set s4 | 4 |
| 0100 | PUCCH resource set s5 | 8 |
| 0101 | PUCCH resource set s6 | 8 |
| 0110 | PUCCH resource set s7 | 8 |
| 0111 | PUCCH resource set s8 | 8 |
| 1000 | PUCCH resource set s9 | 8 |
| 1001 | PUCCH resource set s10 | 8 |
| 1010 | PUCCH resource set s11 | 16 |
| 1011 | PUCCH resource set s12 | 16 |
| 1100 | PUCCH resource set s13 | 16 |
| 1101 | PUCCH resource set s14 | 16 |
| 1110 | PUCCH resource set s15 | 16 |
| 1111 | PUCCH resource set s16 | 16 |

The parameters of each PUCCH resource in each resource set are preset by the protocol. For example, the parameters of one PUCCH resource set are shown in Table 4. This set includes 8 PUCCH resources. The parameters of another PUCCH resource set are shown in Table 5. This set includes 4 PUCCH resources.

TABLE 4

Mapping from ARI field to PUCCH resource within one resource set

| ARI MSB, LSB | PUCCH format | Number of OFDM symbols | PRB |
|---|---|---|---|
| 000 | PUCCH format 0 | 1 | PRB 0 |
| 001 | PUCCH format 0 | 1 | PRB 1 |
| 010 | PUCCH format 0 | 2 | PRB 0 |
| 011 | PUCCH format 0 | 2 | PRB 1 |
| 100 | PUCCH format 1 | 10 | PRB 0 |
| 101 | PUCCH format 1 | 10 | PRB 1 |
| 110 | PUCCH format 1 | 14 | PRB 0 |
| 111 | PUCCH format 1 | 14 | PRB 1 |

TABLE 5

Mapping from ARI field to PUCCH resource within one resource set

| ARI MSB, LSB | PUCCH format | Number of OFDM symbols | PRB |
|---|---|---|---|
| 00 | PUCCH format 0 | 1 | PRB 0 |
| 01 | PUCCH format 0 | 2 | PRB 0 |
| 10 | PUCCH format 1 | 10 | PRB 0 |
| 11 | PUCCH format 1 | 14 | PRB 0 |

The number of resources in the PUCCH resource set for transmitting the HARQ-ACK configured by the UE-specific high-layer signaling may be different or the same as the number of resources in one PUCCH resource set used to transmit the HARQ-ACK indicated by the RMSI. For example, the number of resources in the PUCCH resource set for transmitting the HARQ-ACK configured by the UE-specific higher layer signaling is 4, and the number of resources in the PUCCH resource set for transmitting the HARQ-ACK indicated by the RMSI may be 4, or 8.

Step 320: The UE determines the PUCCH resources for transmitting the HARQ-ACK.

The UE obtains the PUCCH resources for transmitting the HARQ-ACK by receiving the PUCCH resource indication information in the PDCCH scheduling the PDSCH. As the number of resources in the PUCCH resource set for transmitting the HARQ-ACK configured by the UE-specific higher layer signaling may be different or the same as the number of resources in one PUCCH resource set used to transmit the HARQ-ACK indicated by the RMSI, the number of bits of the indication information of the PUCCH resources in different types of PUCCH resource sets may be different or the same, which depends on whether the number of resources in the PUCCH resource set for transmitting the HARQ-ACK configured by the UE-specific high-layer signaling is the same or not as the number of resources in the PUCCH resource set for transmitting the HARQ-ACK indicated by the RMSI.

When the number of resources in the PUCCH resource set for transmitting the HARQ-ACK configured by the UE-specific high-layer signaling is different from the number of resources in the PUCCH resource set for transmitting the HARQ-ACK indicated by the RMSI:

Method One:

The numbers of bits of DCI in the PDCCHs including the PUCCH resource indication information may be the same, and the numbers of bits of the indication information used to indicate the PUCCH resources in different types of PUCCH resource sets are different. For example, the DCI includes M bits, where 2 bits are ARI, 2 bits are the indication field of the number of HARQ processes, and other fields are further included. When the PUCCH resources in the PUCCH resource set for transmitting the HARQ-ACK configured by the UE-specific higher layer signaling are indicated, 2 bits of the ARI are used to indicate one PUCCH resource among the 4 PUCCH resources in the PUCCH resource set for transmitting the HARQ-ACK configured by the UE-specific high-layer signaling, which is referred to as a first PUCCH resource indication mode.

When the PUCCH resources in the PUCCH resource set for transmitting the HARQ-ACK feedback information are indicated by the RMSI, 4 bits, including 2 bits of the ARI and 2 bits for indicating the number of HARQ processes, are used to indicate one of the 16 PUCCH resources in the PUCCH resource set for transmitting the HARQ-ACK indicated by the RMSI, which is referred to as a second PUCCH resource indication mode.

As the first PUCCH resource indication mode and the second PUCCH resource indication mode have the same number of bits of DCI, the indication mode of the PUCCH resources may be determined as follows.

a: The PUCCH resource indication mode may be determined according to the type of the search space (SS). For example, the DCI in the UE-specific SS adopts the first PUCCH resource indication mode, and the DCI in the common SS adopts the second PUCCH resource indication mode.

b: The PUCCH resource indication mode may also be determined according to the type of the Radio Network Temporary Identity (RNTI). For example, the DCI scrambled by the user RNTI (C-RNTI) adopts the first PUCCH resource indication mode, and the DCI scrambled by the temporary user RNTI (TC-RNTI) adopts the second PUCCH resource indication mode.

c: The PUCCH resource indication mode is determined according to the format type of the DCI. For example, the normal DCI format (DCI format 1-1) adopts the first PUCCH resource indication mode, and the fall-back DCI format (DCI format 1-0) adopts the second PUCCH resource indication mode.

d: The PUCCH resource indication mode is jointly determined according to the type of the search space and the type of the RNTI. For example, only the DCI in the common SS and scrambled by the TC-RNTI adopts the second PUCCH resource indication mode, and the DCI in other cases adopts the first PUCCH resource indication mode.

Method Two:

As the numbers of bits of the indication information of the PUCCH resources in the different types of PUCCH resource sets are different, the numbers of bits of DCI in the PDCCHs including the ARI may be different. For example, when the PUCCH resources in the PUCCH resource set for transmitting the HARQ-ACK configured by the UE-specific high-layer signaling are indicated, there are four PUCCH resources in the PUCCH set, with 2-bit ARI is used to indicate one of the four PUCCH resources in the PUCCH resource set for transmitting the HARQ-ACK configured by the UE-specific high-layer signaling, which is referred to as a first PUCCH resource indication mode.

When the PUCCH resources in one PUCCH resource set for transmitting the HARQ-ACK are indicated by the RMSI, 3-bit ARI is used to indicate one of the 8 PUCCH resources in the PUCCH resource set for transmitting the HARQ-ACK indicated by the RMSI, which is called a second PUCCH resource indication mode.

As the numbers of bits of the DCI used in the first PUCCH resource indication mode and the second PUCCH resource indication mode are different, the way of indicating the PUCCH resources may be determined as follows.

a: The number of bits for DCI blind detection may be determined according to the type of the search space (SS, Search space), and then the PUCCH resource indication mode may be determined. For example, the number of bits of DCI blind detection in the UE-specific SS is (N+2, where N is the total number of bits of the other fields except the ARI in the DCI), and the DCI adopts the first PUCCH resource indication mode. The number of bits of DCI blind detection in the common SS is (N+3, where N is the total number of bits of the other fields except the ARI in the DCI), and the DCI adopts the second PUCCH resource indication mode.

b: The PUCCH resource indication mode may also be determined according to the type of the Radio Network Temporary Identity (RNTI). For example, the DCI scrambled by the user RNTI (C-RNTI) adopts the first PUCCH resource indication mode, and the DCI scrambled by the temporary user RNTI (TC-RNTI) adopts the second PUCCH resource indication mode.

c: The PUCCH resource indication mode is determined according to the format type of the DCI. For example, the normal DCI format (DCI format 1-1) adopts the first PUCCH resource indication mode, and the fall-back DCI format (DCI format 1-0) adopts the second PUCCH resource indication mode.

d: The PUCCH resource indication mode is jointly determined according to the type of the search space and the type of the RNTI. For example, only the DCI in the common SS and scrambled by the TC-RNTI adopts the second PUCCH resource indication mode, and the DCI in other cases adopts the first PUCCH resource indication mode.

When the number of resources in the PUCCH resource set for transmitting the HARQ-ACK configured by the UE-specific high-layer signaling is the same as the number of resources in the PUCCH resource set for transmitting the HARQ-ACK indicated by the RMSI:

PUCCH resources in PUCCH resource set for transmitting HARQ-ACK indicated by RMSI and PUCCH resources in PUCCH resource set configured for UE-specific higher layer signaling for indicating HARQ-ACK are respectively indicated in the same PUCCH resource indication mode.

Figure 20:
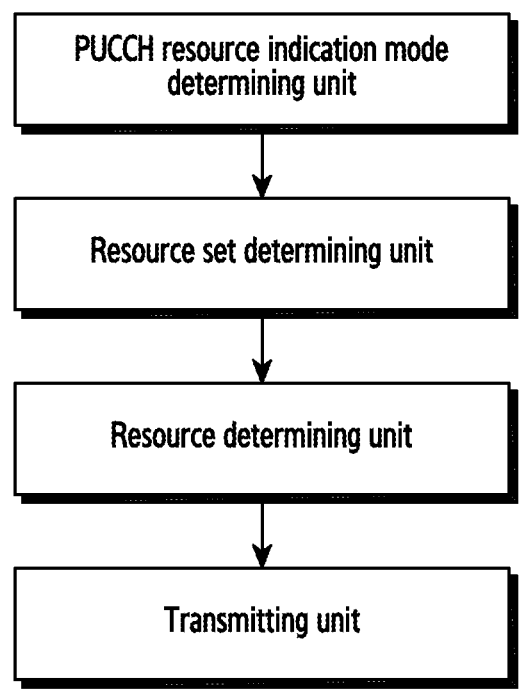
FIG. 20 is a basic structural diagram of an equipment for HARQ-ACK feedback according to the present application.

The foregoing description is a specific implementation of the method for HARQ-ACK feedback in the application. The application further provides an equipment for HARQ-ACK feedback. As shown in FIG. 20, the equipment includes: PUCCH resource indication mode determining unit, a resource set determining unit, a resource determining unit and a transmitting unit; wherein the PUCCH resource indication mode determining unit is used to determine the PUCCH resource indication mode for transmitting the HARQ-ACK; the resource set determining unit is used to determine the PUCCH resource set for transmitting the HARQ-ACK; the resource determining unit is used to determine the PUCCH resources for transmitting the HARQ-ACK feedback information; and the transmitting unit is used to transmit the HARQ-ACK according to the determined PUCCH resources.

A method for HARQ-ACK information feedback, includes determining, by a UE, Physical Uplink Control Channel (PUCCH) resources for transmitting HARQ-ACK feedback information according to received broadcast information and physical layer information, transmitting, by the UE, HARQ-ACK on the determined PUCCH resources.

Herein, the step of determining, by the UE, the PUCCH resources for transmitting the HARQ-ACK feedback information according to the received broadcast information and physical layer information when the physical layer information includes PUCCH resource indication information, includes determining, by the UE, a PUCCH resource set for transmitting HARQ-ACK feedback information according to the broadcast information by receiving the broadcast information, selecting, by the UE, one PUCCH resource from the PUCCH resource set to transmit the HARQ-ACK feedback information by receiving the PUCCH resource indication information in a Physical Downlink Control Channel (PDCCH) scheduling a Physical Downlink Shared Channel (PDSCH).

Herein an indication mode for the PUCCH resources includes indicating the PUCCH resources for transmitting the HARQ-ACK feedback information by the broadcast information and the physical layer information, or indicating the PUCCH resources for transmitting the HARQ-ACK feedback information by a UE-specific high-layer signaling and the physical layer information, before the step of determining, by the UE, the PUCCH resources for transmitting the HARQ-ACK feedback information according to the received broadcast information and physical layer information, the method further includes the UE determines the indication mode of the PUCCH resources as follows: indicating the PUCCH resources for transmitting the HARQ-ACK feedback information by the broadcast information and the physical layer information.

Herein in the PUCCH resource set for transmitting the HARQ-ACK feedback information determined according to the broadcast information, the numbers of PUCCH resources are the same or different.

Herein the PUCCH resource indication information comprises only ARI, and/or the PUCCH resource indication information comprises the ARI and information of other fields.

Herein the other fields comprise at least one of Downlink Assignment (DAI), HARQ timing relationship indication information, and indication information of the number of HARQ processes.

Herein the determining the PUCCH resource indication mode comprises at least one of the following: determining the PUCCH resource indication mode according to a type of a search space of Downlink Control Information (DCI), determining the PUCCH resource indication mode according to a type of a radio network temporary identifier of the DCI, determining the PUCCH resource indication mode jointly according to the type of the search space of the DCI and the type of the Radio Network Temporary Identity (RNTI) of the DCI, determining the PUCCH resource indication mode according to a format type of the DCI.

Herein the determining the PUCCH resource indication mode according to the format type of the DCI includes determining the PUCCH resource indication mode according to the number of bits of the PUCCH resource indication information in the format type of the DCI.

Herein a manner to determine the number of bits of the PUCCH resource indication information includes obtaining the number of bits of the PUCCH resource indication information preset, or determining the number of bits of the PUCCH resource indication information according to the number of PUCCH resources in the PUCCH resource set indicated by the broadcast information.

A UE includes a PUCCH resource indication mode determining unit, a resource set determining unit, a resource determining unit, and a transmitting unit, herein, the PUCCH resource indication mode determining unit is configured to determine a PUCCH resource indication mode for transmitting HARQ-ACK, the resource set determining unit is configured to determine a PUCCH resource set for transmitting the HARQ-ACK, the resource determining unit is configured to determine PUCCH resources for transmitting a HARQ-ACK feedback information, the transmitting unit is configured to transmit the HARQ-ACK according to the determined PUCCH resources.

A UE includes a processor, and a memory configured to store machine-readable instructions that, when executed by the processor, cause the processor to perform the method for HARQ-ACK information feedback of any one of above methods.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

While the disclosure has been shown and described with reference to various embodiments thereof, it will be understood by those skilled in the art that various changes in form and details may be made therein without departing from the spirit and scope of the disclosure as defined by the appended claims and their equivalent.

What is claimed is:

1. A method performed by a user equipment (UE) in a wireless communication system, the method comprising:
   receiving, from a base station, information for configuring a first bandwidth part (BWP) via higher layer signaling, wherein the first BWP is configured to be used in case that a physical layer signaling for a physical downlink shared channel (PDSCH) is not received during a time interval on a current configured BWP for physical downlink control channel (PDCCH) detection and PDSCH reception;
   receiving, from the base station, signals on a second BWP set as the current configured BWP and is different from the first BWP;
   in a case that the physical layer signaling for the PDSCH is not received on the second BWP during the time interval, changing the current configured BWP from the second BWP to the first BWP; and
   identifying that an interval until a beginning of a time slot where the UE can receive signals on the first BWP is required, based on the time interval for the changing of the current configured BWP, the UE being configured not to receive signals within the interval,
   wherein the time interval is configured by higher layer signaling, and
   wherein the second BWP is indicated by downlink control information (DCI) including a sequence number of the second BWP among one or more BWPs configured via higher layer signaling.

2. The method of claim 1, wherein the information includes a sequence number of the first BWP among one or more BWPs configured via higher layer signaling.

3. A method performed by a base station a wireless communication system, the method comprising:
   transmitting, to a user equipment (UE), information for configuring a bandwidth part (BWP) via higher layer signaling, wherein the first BWP is configured to be used in case that a physical layer signaling for a physical downlink shared channel (PDSCH) is not received during a time interval on a current configured BWP for physical downlink control channel (PDCCH) detection and PDSCH reception;

transmitting, to the UE, signals on a second BWP different from the first BWP; and transmitting, to the UE, signals on the first BWP based on a changing of the current configured BWP from the second BWP to the first BWP, wherein the time interval is configured by higher layer signaling, wherein the second BWP is indicated by downlink control information (DCI) including a sequence number of the second BWP among one or more BWPs configured via higher layer signaling, and wherein, based on the time interval for the changing of the current configured BWP, signals are not transmitted to the UE within a required interval until a beginning of a time slot where the UE can receive signals on the first BWP.

4. The method of claim 3, wherein the information includes a sequence number of the first BWP among one or more BWPs configured via higher layer signaling.

5. A user equipment (UE) in a wireless communication system, the UE comprising:

at least one transceiver; and at least one processor coupled to the at least one transceiver and configured to:

receive, from a base station, information for configuring a first bandwidth part (BWP) via higher layer signaling, wherein the first BWP is configured to be used in case that a physical layer signaling for a physical downlink shared channel (PDSCH) is not received during a time interval on a current configured BWP for physical downlink control channel (PDCCH) detection and PDSCH reception, receive, from the base station, signals on a second BWP set as the current configured BWP and is different from the first BWP, in a case that the physical layer signaling for the PDSCH is not received on the second BWP during the time interval, change the current configured BWP from the second BWP to the first BWP, and identify that an interval until a beginning of a time slot where the UE can receive signals on the first BWP is required, based on the time interval for the changing of the current configured BWP, the UE being configured not to receive signals within the interval, wherein the time interval is configured by higher layer signaling, and wherein the second BWP is indicated by downlink control information (DCI) including a sequence number of the second BWP among one or more BWPs configured via higher layer signaling.

6. The UE of claim 5, wherein the information includes a sequence number of the first BWP among one or more BWPs configured via higher layer signaling.

7. A base station a wireless communication system, the base station comprising:

at least one transceiver; and at least one processor coupled to the at least one transceiver and configured to:

transmit, to a user equipment (UE), information for configuring a bandwidth part (BWP) via higher layer signaling, wherein the first BWP is configured to be used in case that a physical layer signaling for a physical downlink shared channel (PDSCH) is not received during a time interval on a current configured BWP for physical downlink control channel (PDCCH) detection and PDSCH reception, transmit, to the UE, signals on a second BWP different from the first BWP, and transmit, to the UE, signals on the first BWP based on a changing of the current configured BWP from the second BWP to the first BWP, wherein the time interval is configured by higher layer signaling, wherein the second BWP is indicated by downlink control information (DCI) including a sequence number of the second BWP among one or more BWPs configured via higher layer signaling, and wherein, based on the time interval for the changing of the current configured BWP, signals are not transmitted to the UE within a required interval until a beginning of a time slot where the UE can receive signals on the first BWP.

8. The base station of claim 7, wherein the information includes a sequence number of the first BWP among one or more BWPs configured via higher layer signaling.

* * * * *